(12) United States Patent
Noh et al.

(10) Patent No.: US 12,501,375 B2
(45) Date of Patent: Dec. 16, 2025

(54) METHOD AND DEVICE FOR TRANSMISSION OR RECEPTION OF INTEGRATED ACCESS BACKHAUL NODE

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Woo Park, Daejeon (KR); Jae Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 362 days.

(21) Appl. No.: 18/258,674

(22) PCT Filed: Jan. 6, 2022

(86) PCT No.: PCT/KR2022/000239
§ 371 (c)(1),
(2) Date: Jun. 21, 2023

(87) PCT Pub. No.: WO2022/149880
PCT Pub. Date: Jul. 14, 2022

(65) Prior Publication Data
US 2024/0306100 A1    Sep. 12, 2024

(30) Foreign Application Priority Data

Jan. 6, 2021  (KR) .................. 10-2021-0001678
Jan. 5, 2022  (KR) .................. 10-2022-0001699

(51) Int. Cl.
*H04W 52/40*   (2009.01)
*H04W 52/42*   (2009.01)
*H04W 72/0446* (2023.01)

(52) U.S. Cl.
CPC .......... *H04W 52/40* (2013.01); *H04W 52/42* (2013.01); *H04W 72/0446* (2013.01)

(58) Field of Classification Search
CPC .. H04W 52/40; H04W 52/42; H04W 72/0446
(Continued)

(56) References Cited

U.S. PATENT DOCUMENTS 9,432,175 B2   8/2016  Chen et al.
10,491,315 B2  11/2019 Kim et al.
(Continued)

FOREIGN PATENT DOCUMENTS

CA       3114643 A1     4/2020
WO    2021156825 A1     8/2021

OTHER PUBLICATIONS

3GPP TS 38.214 V16.3.0 (Sep. 2020), 3rd Generation Partnership Project; Technical Specification Group Radio Access Network; NR; Physical layer procedures for data (Release 16), pp. 1-167.
(Continued)

*Primary Examiner* — Faisal Choudhury
(74) *Attorney, Agent, or Firm* — Rabin & Berdo, P.C.

(57) ABSTRACT

Disclosed are a method and a device for transmission or reception of an integrated access backhaul node. An operation method of a first IAB node comprises the steps of: receiving information of a power offset from a second IAB node; deriving a first EPRE of a PDSCH transmitted by the second IAB node on the basis of the power offset; transmitting, to the second IAB node, a first message requesting adjustment of transmission power of the PDSCH; receiving, from the second IAB node, a second message including information on the adjusted transmission power of the PDSCH; and applying the adjusted transmission power to the first EPRE, so as to derive the adjusted EPRE of the PDSCH.

20 Claims, 19 Drawing Sheets

(58) Field of Classification Search
USPC .......................................................... 370/336
See application file for complete search history.

(56) References Cited

U.S. PATENT DOCUMENTS

| | | | |
|---|---|---|---|
| 10,892,883 | B2 | 1/2021 | Luo et al. |
| 12,114,297 | B2 | 10/2024 | Liu et al. |
| 2015/0289172 | A1 | 10/2015 | Choi et al. |
| 2019/0028164 | A1* | 1/2019 | Li .................... H04B 7/0665 |
| 2020/0045610 | A1 | 2/2020 | Shih et al. |
| 2020/0169956 | A1 | 5/2020 | Sun et al. |
| 2020/0275499 | A1 | 8/2020 | Novlan et al. |
| 2020/0351847 | A1 | 11/2020 | Kim et al. |
| 2021/0058874 | A1 | 2/2021 | Pan et al. |
| 2022/0104147 | A1* | 3/2022 | Cui .................... H04W 52/243 |
| 2022/0360309 | A1* | 11/2022 | Long .................... H04L 1/0026 |

OTHER PUBLICATIONS

3GPP TS 38.331 V16.2.0 (Sep. 2020), 3rd Generation Partnership Project; Technical Specification Group Radio Access Network; NR; Radio Resource Control (RRC) protocol specification (Release 16), pp. 1-921.

* cited by examiner

METHOD AND DEVICE FOR TRANSMISSION OR RECEPTION OF INTEGRATED ACCESS BACKHAUL NODE

TECHNICAL FIELD

The present disclosure relates to a transmission and reception technique of an integrated access and backhaul node, and more particularly, to a transmission and reception technique of an integrated access and backhaul node for supporting simultaneous transmission and reception operations of the integrated access and backhaul node.

BACKGROUND ART

For the processing of rapidly increasing wireless data after the commercialization of the 4th generation (4G) communication system (e.g., Long Term Evolution (LTE) communication system, LTE-Advanced (LTE-A) communication system, or the like), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered.

Due to the need for higher data rates and larger capacity in such the NR communication system, the introduction of integrated access and backhaul (IAB) technologies is being considered. In such an IAB environment, an IAB node may be composed of two elements: an IAB-distributed unit (IAB-DU) and an IAB-mobile terminal (IAB-MT).

The conventional IAB node may transmit/receive signals using a half-duplex scheme in consideration of time-division multiplexing (TDM) between the IAB-DU and the IAB-MT. Due to this, it may be required to allow simultaneous transmission and reception between the IAB-DU and the IAB-MT for the purpose of increasing the limited system capacity of the IAB node and minimizing the latency thereof. However, when simultaneous transmission and reception of the IAB-DU and the IAB-MT are allowed, crosslink-interference may be caused.

DISCLOSURE

Technical Problem

The present disclosure for solving the above-described problem is directed to providing a method of transmission and reception in an IAB node for efficiently supporting simultaneous transmission and reception operation of an IAB-DU and an IAB-MT, and an apparatus therefor.

Technical Solution

An operation method of a first IAB node, according to a first exemplary embodiment of the present disclosure for achieving the objective, may comprise: receiving, from a second IAB node, information of a power offset; deriving a first energy per resource element (EPRE) of a physical downlink shared channel (PDSCH) transmitted by the second IAB node based on the power offset; transmitting, to the second IAB node, a first message requesting adjustment of a transmission power of the PDSCH; receiving, from the second IAB node, a second message including information on an adjusted transmission power of the PDSCH; and deriving an adjusted EPRE of the PDSCH by applying the adjusted transmission power to the first EPRE.

The operation method may further comprise performing communications with one or more other IAB nodes in consideration of the adjusted EPRE of the PDSCH transmitted by the second IAB node.

The communications with the one or more other IAB nodes may be simultaneous transmission and reception operations.

The operation method may further comprise receiving, from the second IAB node, information on one or more beams to which the adjusted transmission power is applied.

The information on the one or more beams may be information on TCI state(s) or reference signal (RS) resource index(es).

When information on a beam to which the adjusted transmission power is applied is not received, the adjusted transmission power may be estimated to be applied to all beams of the first IAB node.

The first PRE may be derived by applying the power offset to a second EPRE of a channel state information-reference signal (CSI-RS) transmitted by the second IAB node, and information of the second EPRE may be received from the second IAB node.

Each of the first message and the second message may be a medium access control (MAC) control element (CE).

The first message may include an adjustment value of the transmission power required by the first IAB node.

The second message may further include information on time resources to which the adjusted transmission power is applied, and the time resources may be configured in units of slots.

An operation method of a second IAB node, according to a second exemplary embodiment of the present disclosure for achieving the objective, may comprise: transmitting, to a first IAB node, information of a power offset used to derive a first energy per resource element (EPRE) of a physical downlink shared channel (PDSCH) transmitted by the second IAB node; receiving, from the first IAB node, a first medium access control (MAC) control element (CE) requesting adjustment of a transmission power of the PDSCH; determining an adjusted transmission power of the PDSCH based on the first MAC CE; and transmitting, to the first IAB node, a second MAC CE including information on the adjusted transmission power of the PDSCH, wherein an adjusted EPRE of the PDSCH is derived by applying the adjusted transmission power to the first EPRE.

The operation method may further comprise transmitting, to the first IAB node, information on one or more beams to which the adjusted transmission power is applied.

The information on the one or more beams may be information on TCI state(s) or reference signal (RS) resource index(es).

The operation method may further comprise transmitting, to the first IAB node, information of a second EPRE of a channel state information-reference signal (CSI-RS) transmitted by the second IAB node, wherein the first EPRE may be derived by applying the power offset to the second EPRE.

The second MAC CE may further include information on time resources to which the adjusted transmission power is applied, and the time resources may be configured in units of slots.

A first IAB node, according to a third exemplary embodiment of the present disclosure for achieving the objective, may comprise: a processor; a memory electronically communicating with the processor; and instructions stored in the memory, wherein when executed by the processor, the instructions may cause the first IAB node to: receive, from a second IAB node, information of a power offset; derive a first energy per resource element (EPRE) of a physical downlink shared channel (PDSCH) transmitted by the second IAB node based on the power offset; transmit, to the second IAB node, a first message requesting adjustment of a transmission power of the PDSCH; receive, from the second IAB node, a second message including information on an adjusted transmission power of the PDSCH; and derive an adjusted EPRE of the PDSCH by applying the adjusted transmission power to the first EPRE.

The instructions may further cause the first IAB node to perform communications with one or more other IAB nodes in consideration of the adjusted EPRE of the PDSCH transmitted by the second IAB node.

The instructions may further cause the first IAB node to receive, from the second IAB node, information on one or more beams to which the adjusted transmission power is applied.

The information on the one or more beams may be information on TCI state(s) or reference signal (RS) resource index(es).

When information on a beam to which the adjusted transmission power is adjusted is not received, the adjusted transmission power may be estimated to be applied to all beams of the first IAB node.

Advantageous Effects

According to the present disclosure, when the IAB node transmits downlink signals to the terminal, the IAB node may transmit the downlink signals by adjusting powers thereof in consideration of signal transmission/reception with an upper node. In this case, the IAB node may transmit power-adjusted signals by applying the same power offset to all downlink signals transmitted to the terminal. Alternatively, the IAB node may transmit the downlink signals to the terminal by adjusting powers for each beam. Alternatively, the IAB node may transmit the downlink signals to the terminal by adjusting powers for each channel or for each signal.

As described above, when the IAB node transmits the downlink signals to the terminal by adjusting the power(s) thereof, cross-interference can be alleviated when receiving downlink signals from the upper node. Accordingly, cross-interference can be alleviated when the IAB node receives downlink signals from the upper node, and simultaneous transmission/reception between the IAB-DU and the IAB-MT can be facilitated. As a result, the IAB node can increase the system capacity and minimize the latency.

BEST MODE OF THE INVENTION

Figure 1:
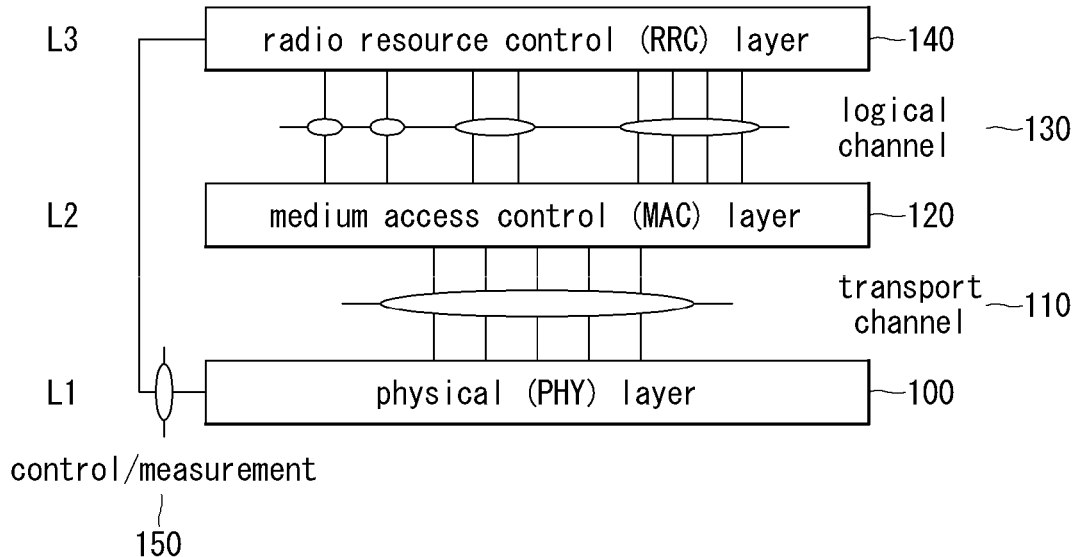
FIG. 1 is a conceptual diagram illustrating a radio interface protocol in a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a radio interface protocol in a communication system.

Referring to FIG. 1, in a radio interface protocol of a communication system, a physical layer (PHY) 100 may be connected to a medium access control (MAC) layer 120 through transport channels 110. The physical layer 100 may transmit and receive control or measurement information to and from a radio resource control (RRC) layer 140. The MAC layer 120 may be connected to an upper layer through logical channels 130. In an exemplary embodiment, the physical layer 100 may be referred to as layer 1 (L1), and the MAC layer 120 and the RRC layer 140 may be referred to as upper layers. Alternatively, the MAC layer 120 may be referred to as layer 2 (L2) and the RRC layer 140 may be referred to as layer 3 (L3).

L1 signaling may refer to 'signaling of downlink control information (DCI) transmitted on a physical downlink control channel (PDCCH)', 'signaling of uplink control information (UCI) transmitted on a physical uplink control channel (PUCCH)', and/or 'signaling of sidelink control information (SCI) transmitted on a physical sidelink control channel (PSCCH)'.

Higher layer signaling may refer to 'L2 signaling transmitted through a MAC control element (CE)' and/or 'L3 signaling transmitted through RRC signaling'. Signaling between base stations, signaling for a distributed unit (DU), signaling for a central unit (CU), and/or signaling for elements constituting a base station (e.g., F1, next-generation (NG) interface) may be referred to as the higher layer signaling. The radio interface may include an 'interface between a user equipment (UE) and a base station (gNB)', an 'interface between an IAB-DU and an IAB-MT', an interface between an IAB-DU and a terminal', an 'interface between terminals', and the like.

Meanwhile, the 5G communication system may use one or more of numerologies of Table 1 for various purposes such as inter-carrier interference (ICI) according to frequency band characteristics and latency reduction according to service characteristics. According to the extension or change of the frequency band, a new numerology may be added to Table 1. The terminal may identify a numerology u applied to each of a downlink bandwidth part (BWP) and an uplink BWP based on a subcarrier spacing (e.g., $\Delta f$) and/or a cyclic prefix (CP), which is a higher layer parameter.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Figure 2:
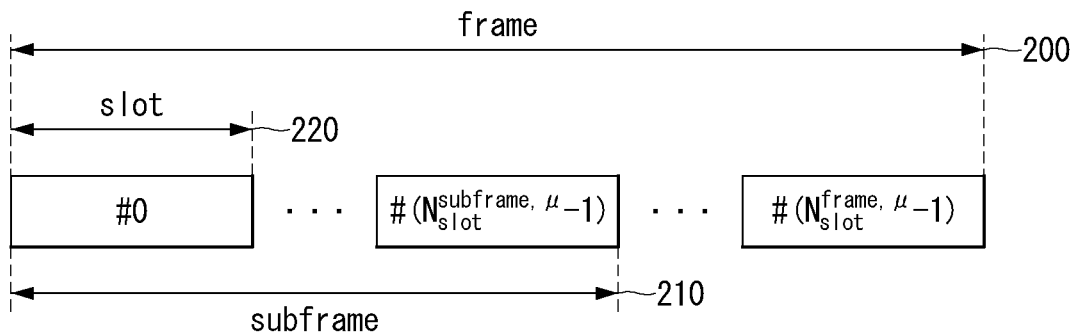
FIG. 2 is a conceptual diagram illustrating time resources in a communication system.

FIG. 2 is a conceptual diagram illustrating time resources in a communication system.

Referring to FIG. 2, a frame 200 may include $N_{slot}^{frame,\mu}/N_{slot}^{subframe,\mu}$ subframes 210. The subframe 210 may include $N_{slot}^{subframe,\mu}$ slots 220. The slot 220 may include $N_{symb}^{slot}$ (e.g., 14) OFDM symbols. $N_{symb}^{slot}$, $N_{slot}^{subframe,\mu}$, and $N_{slot}^{frame,\mu}$ may be defined as values in Table 2 according to a numerology when a normal CP is used. $N_{symb}^{slot}$, $N_{slot}^{subframe,\mu}$, and $N_{slot}^{frame,\mu}$ may be defined as values in Table 3 according to a numerology when an extended CP is used. Each of the symbols included in one slot may be configured as a downlink (DL) symbol, a flexible (FL) symbol, or a uplink (UL) symbol by higher layer signaling. Alternatively, each of the symbols included in the slot may be configured as a DL symbol, FL symbol, or UL symbol by a combination of higher layer signaling and L1 signaling.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 2-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the 5G communication system, the frame 200 may have a length of 10 ms, and the subframe 210 may have a length of 1 ms. The frame 200 may be divided into two half-frames (e.g., half frames #0 and #1) having the same length. The half-frame #0 may include subframes #0 to #4, and the half-frame #1 may include subframes #5 to #9. In one carrier, a set of frames for uplink and a set of frames for downlink may exist.

Figure 3:
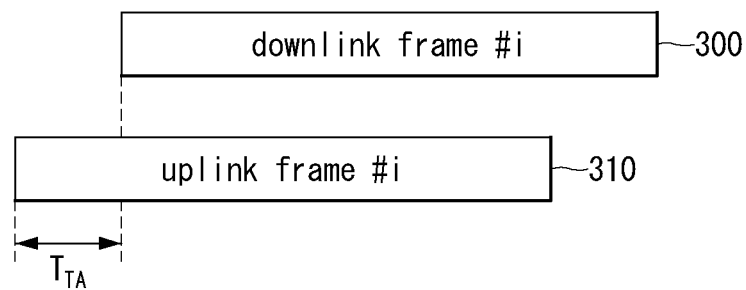
FIG. 3 is a conceptual diagram illustrating a downlink frame reception timing and an uplink frame transmission timing.

FIG. 3 is a conceptual diagram illustrating a downlink frame reception timing and an uplink frame transmission timing.

Referring to FIG. 3, a time difference between a reception timing of a downlink frame #i 300 and a transmission timing of an uplink frame #i 310 may be a $T_{TA}$. The terminal may start transmission of the uplink frame #i 310 at a time earlier by $T_{TA}$ than a reception start time of the downlink frame #i 300. $T_{TA}$ may be referred to as a timing advance or timing adjustment (TA). The base station may instruct the terminal to change $T_{TA}$ through higher layer signaling or L1 signaling. For example, $T_{TA}$ may be configured as $T_{TA}=(N_{TA}+N_{TA,offset})T_c$. In the 5G communication system, $T_c$ may be defined as $$T_c = \frac{1}{(\Delta f_{max} \cdot N_f)},$$

$\Delta f_{max}$ may be defined as $\Delta f_{max}=480$ kHz, $N_f$ may be defined as $N_f=4096$, $N_{TA,offset}$ may be a value set by L3 signaling, and $N_{TA}$ may be a value determined by Equation 1 below by a value TA indicated by L2 signaling. $N_{TA,offset}$ and $N_{TA}$ may be examples for a specific situation, and may be configured as different values.

$$N_{TA} = \begin{cases} T_A \cdot 16 \cdot \frac{64}{2^\mu} \text{(for random access response)} \\ N_{TA\_old} + ((T_A - 31) \cdot 16 \cdot 64/2^\mu) \text{ (for other cases)} \end{cases}$$ [Equation 1]

Figure 4:
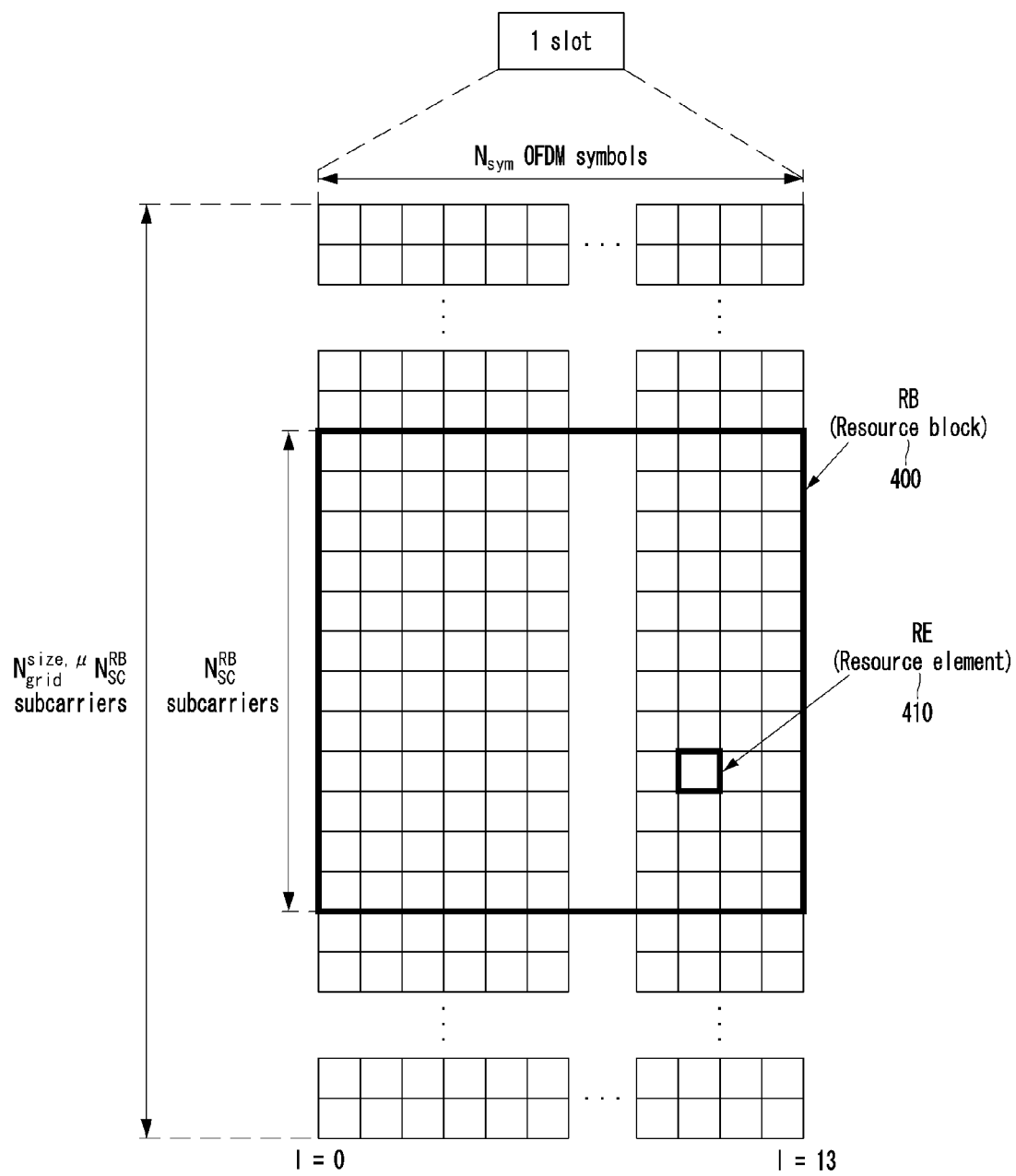
FIG. 4 is a conceptual diagram illustrating a resource grid in a communication system.

FIG. 4 is a conceptual diagram illustrating a resource grid in a communication system.

Referring to FIG. 4, a resource grid of a communication system may have $N_{grid}^{size,\mu} N_{sc}^{RB}$ subcarriers and $N_{slot}^{subframe,\mu}$ OFDMs. The resource grid may be defined for each numerology and each carrier.

$N_{grid}^{start,\mu}$ may mean a position of a common resource block (CRB) indicated by higher layer signaling. $N_{grid}^{size,\mu}$ may mean the number of resource blocks (RBs) grid 400 (e.g., carrier bandwidth) starting from the CRB.

The above-described parameters may have different values for each link direction (e.g., uplink, downlink, or sidelink) and/or each numerology. The numerology may mean a subcarrier spacing. Each element in the resource grid for an antenna port p and a SCS configuration u may be referred to as a resource element (RE) 410. The RE 410 may be uniquely defined for each position $(k,l)_{p,\mu}$. In this case, k may be a subcarrier index in the frequency domain, and l may indicate a symbol index in the time domain. $RE(k,l)^{p,\mu}$ may correspond to a physical resource used to transmit a physical channel or a signal complex value $\alpha_{k,l}^{(p,\mu)}$. One RB 400 may be defined as consecutive $N_{sc}^{RB}=12$ subcarriers in the frequency domain.

The 5G NR communication system has introduced the concept of BWPs in order to reduce high implementation complexity and power consumption of terminals due to the widened carrier bandwidth. One BWP may be composed of contiguous CRBs, a starting RB position $N_{BWP,i}^{start,\mu}$ of the BWP and the number $N_{BWP,i}^{size,\mu}$ of RBs constituting the BWP may satisfy Equations 2 and 3.

$$N_{grid,x}^{start,\mu} \leq N_{BWP,i}^{start,\mu} < N_{grid,x}^{start,\mu} + N_{grid,x}^{size,\mu}$$ [Equation 2]

$$N_{grid,x}^{start,\mu} < N_{BWP,i}^{start,\mu} + N_{BWP,i}^{size,\mu} \leq N_{grid,x}^{start,\mu} + N_{grid,x}^{size,\mu}$$ [Equation 3]

The terminal may be configured with up to four downlink BWPs within one component carrier (CC), and only one downlink BWP may be activated at a time. The terminal may not receive a physical downlink shared channel (PDSCH), a physical downlink control channel (PDCCH), a channel state information reference signal (CSI-RS), or the like outside the activated BWP. The terminal may be configured with up to four uplink BWPs within one CC, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
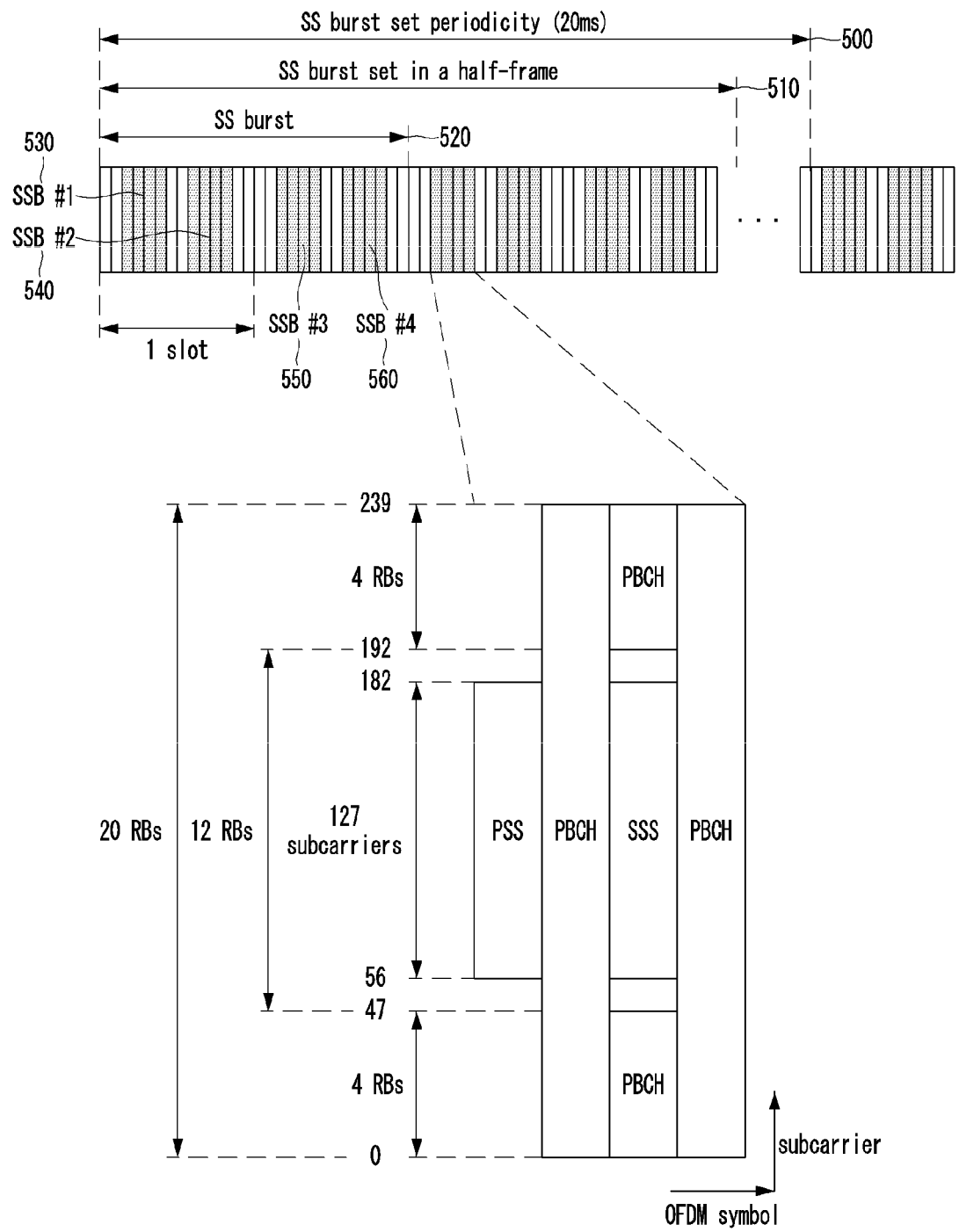
FIG. 5 is a conceptual diagram illustrating a synchronization signal/physical broadcast channel (SS/PBCH) block of a communication system.

FIG. 5 is a conceptual diagram illustrating a synchronization signal/physical broadcast channel (SS/PBCH) block of a communication system.

Referring to FIG. 5, an SS/PBCH block may include a primary synchronization signal (PSS), a secondary synchronization signal (SSS), and a PBCH. The PSS may be transmitted in 12 RBs in the first symbol of the SS/PBCH block. The SSS may be transmitted in 12 RBs in the third symbol of the SS/PBCH block. The PBCH may be transmitted in the second symbol, the third symbol, and the fourth symbol of the SS/PBCH block. In the second and fourth symbols, the PBCH may be transmitted through 20 RBs. If a 15 kHz SCS is used, the size of 20 RBs may be 3.6 MHz. The base station may transmit one SSB using the same beam.

When a plurality of beams are used (e.g., when the number of antennas of the base station increases, when one or more analog beams are used to support a high frequency, etc.), the base station may transmit a plurality of SSBs using multiple beams. The beam may be expressed by a transmission precoding, a spatial transmission filter, a transmission configuration indication (TCI), or the like. For example, the base station may transmit a plurality of SSBs 530, 540, 550, and 560 using a plurality of beams (e.g., beam #1, beam #2, beam #3, beam #4). In this case, it may be possible for one or more SSBs to be transmitted within one slot according to a pattern predetermined for each numerology. The SSBs 530, 540, 550, and 560 to which different beams are applied may be included in an SS burst 520. The terminal may assume a half-frame window having a length of 5 ms at a time of monitoring SSB(s). An SS burst set 510 configured by higher layer signaling within the half-frame may include one or more SS bursts 520. In an initial access procedure, the terminal may assume that a periodicity of the SS burst set 500 is 20 ms when RRC configuration values are unknown or unavailable, and may measure SSB(s) based on the above-mentioned assumption. For example, the terminal may receive the SSB(s) based on SSB configuration information defined in Tables 4 and 5 below.

TABLE 4

| | |
|---|---|
| MIB ::= | SEQUENCE { |
| systemFrameNumber | |
| subCarrierSpacingCommon | |
| ssb-SubcarrierOffset | // SSB subcarrier offset (0~15) |
| dmrs-TypeA-Position | |
| pdcch-ConfigSIB1 | |
| cellBarred | |
| intraFreqReselection | |
| spare | |
| } | |
| MeasObjectNR ::= | SEQUENCE { |
| ssbFrequency | // Absolute Radio Frequency Channel Number (ARFCN) of SSB |
| ssbSubcarrierSpacing | // Numerology of SSB |
| smtc1 | |
| | // first SSB measurement timing configuration (SMTC) configured with reference to |
| smtc2 | // Second SMTC configured with reference to SSB-MTC |
| ... | |
| ... | |
| } | |

TABLE 5

| | |
|---|---|
| SSB-Index | // SSB index within SS-burst |
| SSB-MTC ::= | SEQUENCE { |
| // timing occasion configuration for SSBs to be measured by terminal | |
| periodicityAndOffset | CHOICE { |
| sf5 | // offset when a SSB reception window has a legnth of 5 subframes |
| sf10 | // offset when a SSB reception window has a legnth of 10 subframes |
| sf20 | // offset when a SSB reception window has a legnth of 20 subframes |
| sf40 | // offset when a SSB reception window has a legnth of 40 subframes |
| sf80 | // offset when a SSB reception window has a legnth of 80 subframes |
| sf160 | // offset when a SSB reception window has a legnth of 160 subframes |
| }, | |
| duration | // a lengh of a SSB recepion window (number of subframes) |
| } | |
| SSB-MTC2 ::= | SEQUENCE { |
| pci-List | // physical cell IDs (PCIs) following the SMTC configuration |
| periodicity | // SMTC periodicity (number of subframes) |
| } | |

Figure 6:
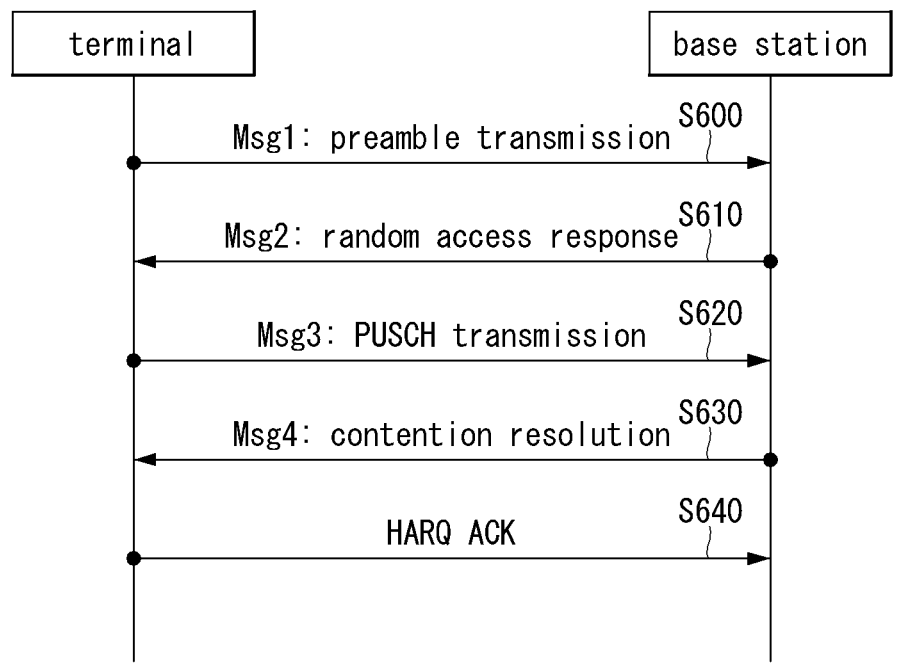
FIG. 6 is a sequence chart illustrating a first exemplary embodiment of a random access procedure.

FIG. 6 is a sequence chart illustrating a first exemplary embodiment of a random access procedure.

Referring to FIG. 6, in a random access procedure, the terminal may transmit a physical random access channel (PRACH) preamble (e.g., Msg1) to the base station (S600). A random access-radio network temporary identifier (RA-RNTI) may be determined based on a transmission resource of the PRACH preamble. For example, RA-RNTI may be calculated by Equation 4.

$$RA\text{-}RNTI = 1 + s\_id + 14 \times t\_id + 14 \times 80 \times f\_id + 14 \times 80 \times 8 \times ul\_carrier\_id \quad \text{[Equation 4]}$$

In Equation 4, s_id may be an index of the first OFDM symbol of a PRACH occasion (RO), and may be defined as $0 \leq s\_id < 14$. t_id may be the first slot index of the PRACH occasion within a system frame, and may be defined as $0 \leq t\_id < 80$.

f_id may be an index of the PRACH occasion in the frequency domain, and may be defined as $0 \leq f\_id < 8$. ul_carrier_id may be a value according to a type of an uplink carrier used for transmission of the PRACH preamble. In case of a regular uplink carrier, ul_carrier_id may be 0. In case of a supplementary uplink carrier, ul_carrier_id may be 1. Before performing the random access procedure, the terminal may receive system information from an SS/PBCH block received from the base station, and may identify the following information element(s) included in the system information. Alternatively, before performing the random access procedure, the terminal may receive an RRC message from the base station, and may identify the following information element(s) included in the RRC message.

PRACH preamble format

Time/frequency resource information for RACH transmission

Index for a logical root sequence table

Cyclic shift $N_{CS}$

Set type (unrestricted, restricted set A, restricted set B)

Referring back to FIG. 6, the base station may transmit a random access response (RAR) (e.g., Msg2) to the terminal (S610). The base station may calculate the RA-RNTI based on Equation 4. DCI including scheduling information of Msg2 may be scrambled using the RA-RNTI. The DCI including scheduling information of Msg2 may be transmitted before the step S610. The terminal may perform a monitoring operation for a PDCCH (e.g., DCI) by using the RA-RNTI in a RACH response window configured by a higher layer in a type 1 PDCCH common search space (CSS). If the PDCCH is successfully decoded, the terminal may receive the RAR in a PDSCH indicated by the PDCCH. The terminal that has successfully decoded the RAR may identify whether an RA preamble identifier (RAPID) included in the RAR matches a RAPID of Msg1 transmitted by the terminal to the base station.

When the RAPID included in the RAR matches the RAPID of Msg1, the terminal may transmit Msg3 on a PUSCH (S620). The terminal may determine a transmission scheme (e.g., discrete Fourier transform (DFT)-s-OFDM or OFDM) of Msg3 based on a higher layer parameter (e.g., msg3-transformPrecoding). In addition, the terminal may determine an SCS to be used in Msg3 transmission according to a higher layer parameter (e.g., msg3-scs).

The base station may receive Msg3 from the terminal, and may transmit a contention resolution message (e.g., Msg4) to the terminal (S630). DCI scrambled by temporary cell (TC)-RNTI may be transmitted before the step S630, and the DCI may include scheduling information of Msg4. The terminal may start a timer for receiving the contention resolution message, and may perform a monitoring operation for a PDCCH (e.g., DCI) by using TC-RNTI in the type 1 PDCCH CSS until the timer expires. If the DCI is successfully decoded, the terminal may receive Msg4 in a PDSCH indicated by the DCI and may identify a MAC CE included in Msg4. The terminal may set the TC-RNTI to a cell (C)-RNTI. When Msg4 is successfully decoded, the terminal may report a hybrid automatic repeat request (HARQ) acknowledgment (ACK) for Msg4 to the base station (S640).

Meanwhile, the RACH occasion (RO) may mean a time and frequency resource for transmission and reception of the PRACH preamble. The terminal may transmit the PRACH preamble in the RACH occasion. For a multi-beam operation in the 5G communication system, each of a plurality of SSBs may be associated with a different beam.

The terminal may measure multiple SSBs, and may select an optimal SSB (e.g., optimal beam) based on a reference signal received power (RSRP), reference signal received quality (RSRQ), signal-to-noise ratio (SNR), and/or signal-to-noise (SINR) for the SSB.

The terminal may determine a beam (e.g., (TX) spatial filter) to be used for PRACH transmission based on a beam (e.g., (RX) spatial filter) used when receiving the optimal SSB.

A mapping relationship between SSB and RO may be configured for the purpose of allowing the base station or network to know which SSB (beam) the terminal has selected. The base station may identify the SSB (e.g., beam selected by the terminal) mapped to the RO in which the PRACH of the terminal has been transmitted based on the mapping relationship. The mapping relationship between SSB and RO may be determined based on higher layer parameter(s) defined in Tables 6 and 7 below.

TABLE 6

| | |
|---|---|
| RACH-ConfigCommon ::= | SEQUENCE { |
|   rach-ConfigGeneric | // set of RACH parameters |
|   totalNumberOfRA-Preambles | // the total number of RACH preambles (1~63) |
|   ssb-perRACH-OccasionAndCB-PreamblesPerSSB | CHOICE { |
|     oneEighth | // The number of preambles per SSB when one SSB is associated with eight ROs |
|     oneFourth | // The number of preambles per SSB when one SSB is associated with four ROs |
|     oneHalf | // The number of preambles per SSB when one SSB is associated with two ROs |
|     one | // The number of preambles per SSB when one SSB is associated with one RO |
|     two | // The number of preambles per SSB when two SSBs are associated with one RO |
|     four | // The number of preambles per SSB when four SSBs are associated with one RO |
|     eight | // The number of preambles per SSB when eigth SSBs are associated with one RO |
|     sixteen | // The number of preambles per SSB when sixteen SSBs are associated with one RO |
|   } | |
|   groupBconfigured | SEQUENCE { |
|     ra-Msg3SizeGroupA | // The size of a transport block fro contention-based RA of Group A |
|     messagePowerOffsetGroupB | // Threshold for preamble selection |
|     numberOfRA-PreamblesGroupA | // The number of CB preambles per SSB of Group A |
|   } | |
|   ra-ContentionResolutionTimer | // Initial value of a contention resolution timer |
|   rsrp-ThresholdSSB | // Threshold for selection of an SSB and an associated RACH resource |
|   rsrp-ThresholdSSB-SUL | // Threshold for selection of an SSB and an associated RACH resource in SUL |
|   prach-RootSequenceIndex | CHOICE { // RACH root sequence index |
|     1839 | |
|     1139 | |

TABLE 6-continued

```
},
    msg1-SubcarrierSpacing        // SCS for Msg1 transmission
    restrictedSetConfig           // one of {unrestricted, restricted set A, restricted set B}
    msg3-transformPrecoder            // whether to apply transform precoding in transmisison of
Msg3
    ...
}
```

TABLE 7

```
RACH-ConfigGeneric ::=           SEQUENCE {
    prach-ConfigurationIndex    // indicates a preamble format, etc.
    msg1-FDM                    // The number of ROs FDMed at a time
    msg1-FrequencyStart         // frequency-axis offset of the lowest RO with reference to
PRB 0
    zeroCorrelationZoneConfig   // N-CS configuration
    preambleReceivedTargetPower    // Target power level at a network receiving node
    preambleTransMax
        // The maximum number of RA preambe transmissions performed unitl declaration of an
RA failure
    powerRampingStep            // Power ramping step
    ra-ResponseWindow           // Msg2 (RAR) window length (number of slots)
    ...,
}
```

Figure 7:
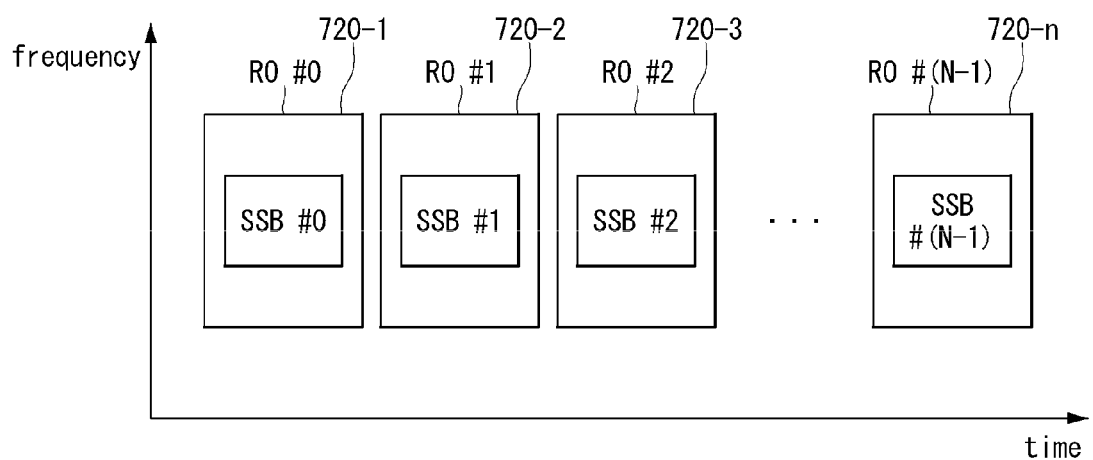
FIG. 7 is a conceptual diagram illustrating a first exemplary embodiment of a mapping relationship between SSB and RO.

FIG. 7 is a conceptual diagram illustrating a first exemplary embodiment of a mapping relationship between SSB and RO.

Referring to FIG. 7, when msg1-FDM is set to 1 and ssb-perRACH-OccasionAndCB-PreamblesPerSSB is set to one, one SSB may be mapped to one RO.

Figure 8:
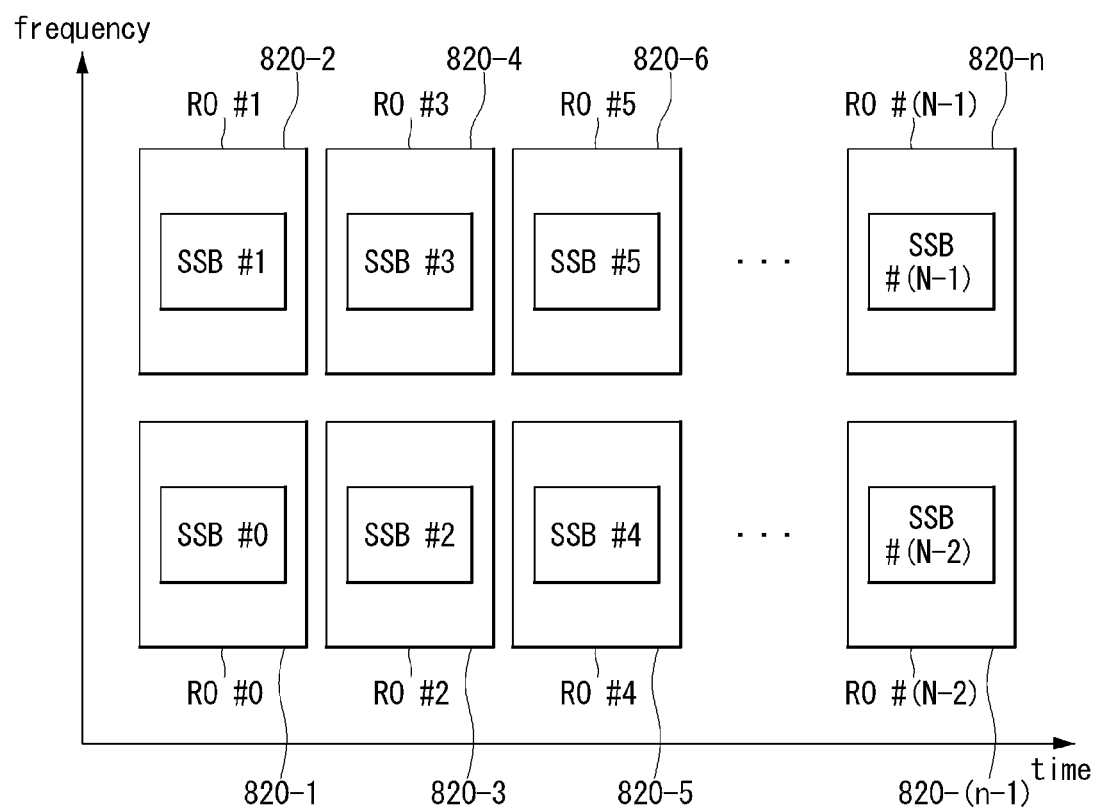
FIG. 8 is a conceptual diagram illustrating a second exemplary embodiment of a mapping relationship between SSB and RO.

FIG. 8 is a conceptual diagram illustrating a second exemplary embodiment of a mapping relationship between SSB and RO.

Referring to FIG. 8, when msg1-FDM is set to 2 and ssb-perRACH-OccasionAndCB-PreamblesPerSSB is set to two, one SSB may be mapped to one RO. Meanwhile, the 5G communication system may support DCI formats as shown in Table 8.

DCI may include downlink control information for one or more cells and may be associated with one RNTI. The DCI may be encoded through a procedure of 1) information element multiplexing, 2) cyclic redundancy check (CRC) addition, 3) channel coding, and 4) rate matching.

The decoding operation for DCI may be performed in consideration of the above-described encoding operation. "DCI is associated with one RNTI" may mean that CRC parity bits of the DCI are scrambled by the RNTI.

DCI may include scheduling information for one or more PUSCHs in a specific cell. A CRC of DCI format 0_1 may be scrambled with C-RNTI, configured scheduling (CS)-RNTI, semi-persistent CSI (SP-CSI)-RNTI, or modulation coding scheme cell (MCS-C)-RNTI.

TABLE 8

| DCI format | Usage |
| --- | --- |
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |

TABLE 8-continued

| DCI format | Usage |
| --- | --- |
| 1_1 | Used for scheduling a PDSCH within one cell or triggering a one-shot HARQ-ACK codebook feedback |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

The DCI format 0_1 may include one or more of the following information elements.

Identifier for DCI format (1 bit): Indicator indicating a UL DCI format, which is always set to 0 in the case of DCI format 0_1

Carrier indicator (0 or 3 bits): Indicator indicating a CC scheduled by the corresponding DCI C DFI flag (0 or 1 bit): Configured grant downlink feedback information (CG-DFI) indicator.

If the DCI format 0_1 is used for CG-DFI indication (when the DFI flag is set to 1), at least one of the following fields may be used:

HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.

TPC command for a scheduled PUSCH (2 bits)

All the remaining bits in the DCI format 0_1 are set to zero

If the DCI format 0_1 is not used for CG-DFI indication (when there is no DFI flag field or DFI flag field is set to 0), at least one of the following fields may be used:

UL/SUL indicator (0 or 1 bit): supplementary UL indicator.

Bandwidth part indicator (0, 1, or 2 bits): Indicator indicating a BWP to be activated among uplink BWPs configured for the terminal.

Frequency domain resource assignment: Indicator for allocating a frequency domain resource.

Time domain resource assignment: Indicator for allocating a time domain resource.

Frequency hopping flag (0 or 1 bit): Frequency axis hopping indicator

Modulation and coding scheme (5 bits)

New data indicator (NDI): Indicator indicating whether allocated data is new data or retransmission data.

Redundancy version (RV): Indicator indicating an RV value when channel coding is applied to allocated data HARQ process number (4 bits): Indicator indicating a HARQ process to be allocated to scheduled data TPC command for a scheduled PUSCH (2 bits): TPC indicator SRS resource indicator: Aperiodic SRS resource selection indicator Precoding information and number of layers: Indicator indicating precoding and the number of transport layers to be used in PUSCH transmission Antenna ports: Indicator for uplink antenna ports to be used for PUSCH transmission SRS request: Indicator indicating whether to transmit aperiodic SRS CSI request: Indicator indicating whether and how to report channel state information PTRS-DMRS association: Indicator indicating a relationship between an uplink phase-noise tracking reference signal (PTRS) antenna port and a demodulation reference signal (DMRS) antenna port DMRS sequence initialization: Indicator for a DMRS sequence initialization value during OFDM-based uplink transmission UL-SCH indicator: Indicator indicating whether or not an uplink shared channel (UL-SCH) is included in a PUSCH (a PUSCH that does not include a UL-SCH needs to include CSI)

Open-loop power control parameter set indication: Indicator indicating a set of open-loop power control (OPLC) parameter set Priority indicator: Uplink transmission priority indicator.

Invalid symbol pattern indicator: Indicator indicating whether to apply an invalid symbol pattern configured by a higher layer Meanwhile, a CRC of the DCI format 1_1 may be scrambled with C-RNTI, CS-RNTI, or MCS-C-RNTI. The DCI format 1_1 may include one or more of the following information elements.

Identifier for DCI format (1 bit): Indicator indicating a DL DCI format, which is always set to 1 in the case of DCI format 1_1

Carrier indicator (0 or 3 bits): Indicator indicating a CC scheduled by the corresponding DCI Bandwidth part indicator (0, 1, or 2 bits): Indicator indicating a BWP to be activated among downlink BWPs configured for the terminal Frequency domain resource assignment: Indicator for allocating a frequency domain resource Time domain resource assignment: Indicator for allocating a time domain resource PRB bundling size indicator: Indicator indicating a type (i.e., static or dynamic) and a size of PRB bundling Rate matching indicator: Indicator indicating a rate matching pattern configured by a higher layer ZP CSI-RS trigger: Indicator for applying aperiodic zero-power (ZP) CSI-RS 'modulation and coding scheme', 'new data indicator', and 'redundancy version' fields for a transport block 1

'modulation and coding scheme', 'new data indicator', and 'redundancy version' fields for a transport block 2

HARQ process number: Indicator indicating a HARQ process to be allocated to scheduled data Downlink assignment index: DAI indicator for HARQ-ACK codebook generation in TDD operation.

TPC command for a scheduled PUCCH: Power control indicator for PUCCH transmission.

PUCCH resource indicator: Indicator indicating a PUCCH resource for transmitting HARQ-ACK information for an allocated PDSCH or a predetermined PDSCH set PDSCH-to-HARQ_feedback timing indicator: Indicator indicating a time domain offset between the allocated PDSCH and the PUCCH Antenna port(s): Indicator indicating antenna ports to be used for PDSCH transmission/reception Transmission configuration indication: Indicator indicating transmission configuration information (TCI) to be used for PDSCH transmission and reception SRS request: Indicator indicating whether to transmit aperiodic SRS DMRS sequence initialization: Indicator for a DMRS sequence initialization value used for PDSCH transmission and reception Priority indicator: PDSCH reception priority indicator Specific DCI formats may be used to deliver the same control information to one or more terminals. For example, a CRC of the DCI format 2_3 may be scrambled with a transmit power control-sounding reference signal-RNTI (TPC-SRS-RNTI), and may include one or more of the following information elements.

Block number 1, Block number 2, . . . , Block number B: Indicators indicating resource regions to which the DCI format 2_3 is applied. A starting part of the block is configured by a higher layer parameter startingBitOfFormat2-3 or startingBitOfFormat2-3SUL-v1530.

When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, . . . , TPC command number N: Indicators indicating uplink power control to be applied to a UL carrier indicated by a higher layer parameter cc-IndexInOneCC-Set.

When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

Meanwhile, specific DCI formats may be used to deliver the same control information to one or more terminals. For example, the DCI format 2_0 having a CRC scrambled with SFI-RNTI may be used for notifying information such as a slot format, a channel occupancy time (COT) duration, an available RB set, and/or a search space set group switching. The DCI format 2_0 may include one or more of the following information elements.

When a higher layer parameter slotFormatCombToAddModList is configured,
Slot format indicator 1, Slot format indicator 2, . . . , Slot format indicator N
When a higher layer parameter availableRB-SetsToAddModList-r16 is configured,
Available RB set indicator 1, Available RB set indicator 2, . . . , Available RB set indicator N1
When a higher layer parameter co-DurationsPerCellToAddModList-r16 is configured,
COT duration indicator 1, COT duration indicator 2, . . . , COT duration indicator N2
When a higher layer parameter searchSpaceSwitchTriggerToAddModList-r16 is configured,
Search space set group switching flag 1, Search space set group switching flag 2, . . . , Search space set group switching flag M The size of the DCI format 2_0 may be set within 128 bits. The size of the DCI format 2_0 may be set by higher layer signaling. The DCI format 2_5 may be used to notify availability of soft-type resources of an IAB node. The DCI format 2_5 having a CRC scrambled with an availability indicator-RNTI (AI-RNTI) may include the following information element(s).

Availability indicator 1, Availability indicator 2, . . . , and Availability indicator N The size of DCI format 2_5 may be set within 128 bits. The size of DCI format 2_5 may be set by higher layer signaling. The terminal may receive configuration information of a CORESET #0 and a search space #0 defined in Table 9.

TABLE 9

| | |
|---|---|
| PDCCH-ConfigSIB1 ::=<br>   controlResourceSetZero<br>   searchSpaceZero<br>} | SEQUENCE { |
| ControlResourceSetZero initial BWP | // indicates a configuration value (0~15) of a CORESET #0 within an |
| SearchSpaceZero initial BWP | // indicates a configuration value (0~15) of a search space #0 within an |

The terminal may refer to configuration information defined in Tables 10 to 12 for cell-specific PDCCH monitoring.\

TABLE 10

| | |
|---|---|
| PDCCH-ConfigCommon ::= | SEQUENCE { |
|   controlResourceSetZero // indicates a configuration value (0~15) of a CORESET #0 within an initial BWP | |
|   commonControlResourceSet | |
|       // configure a common CORESET by referring to CORESET configuration | |
|   searchSpaceZero   // indicates a configuration value (0~15) of a search space #0 within an initial BWP | |
|   commonSearchSpaceList   // configures a search sapce to be used for cell-specific PDCCH monitoring by referring to up to four search space configurations | |
|     searchSpaceSIB1   // search space configuration for SIB1 | |
|     searchSpaceOtherSystemInformation   // search space configuration for SIB2 or other SIBs | |
|     pagingSearchSpace | // search space configuration for paging |
|     ra-SearchSpace<br>procedure<br>    ... | // search space configuration for random access |
| } | |
| ControlResourceSet ::= | SEQUENCE { |
|   controlResourceSetId | // CORESET ID (a value other than 0 is used) |
|   frequencyDomainResources | // configuration of frequency resources of a CORESET |
|   duration<br>CORESET | // configuration of a time-axis length (symbols) of a |
|   cce-REG-MappingType<br>configuration | CHOICE { // CCE-to-REG mapping |
|     interleaved | SEQUENCE { |
|       reg-BundleSize<br>      interleaverSize<br>      shiftIndex<br>    },<br>    nonInterleaved<br>  }, | |

TABLE 11

```
precoderGranularity
    tci-StatesPDCCH-ToAddList
                            // indicates a QCL relation possible between a QCL reference RS and a PDCCH
DMRS
    tci-StatesPDCCH-ToReleaseList
    tci-PresentInDCI        // indicates whether a TCI field exists within the DCI format 1_1
    pdcch-DMRS-ScramblingID // indicates a scrambling initialization value of a PDCCH DMRS
    ...
}
SearchSpace ::=             SEQUENCE {
    searchSpaceId           // search space ID
    controlResourceSetId    // CORESET ID associated with the search space
monitoringSlotPeriodicityAndOffset    CHOICE { // periodicity and offset of a PDCCH
monitoring slot
        sl1                 // performs PDCCH monitoring in every slot
        ...
                            // (omitted) monitoring offset values when a PDCCH monitoring periodicity
is one of 2 to 1280 slots
        s12560              // a monitoring offset value when a PDCCH monitoring periodicity is 2560 slots
    }
    duration                // the number of slots where a search space exists for each occasion
수
    monitoringSymbolsWithinSlot
        // a position of a first symbol on which monitoring is to be performed within a PDCCH
monitoring slot
    nrofCandidates          SEQUENCE {
        aggregationLevel1   // The number of PDCCH candidates in case of aggregation level 1
        aggregationLevel2   // The number of PDCCH candidates in case of aggregation level 2
        aggregationLevel4   // The number of PDCCH candidates in case of aggregation level 4
        aggregationLevel8   // The number of PDCCH candidates in case of aggregation level 8
        aggregationLevel16  // The number of PDCCH candidates in case of aggregation level 16
    }
```

TABLE 12

```
    searchSpaceType                         CHOICE { // indicates a search space type
(common or UE-specific) and DCI formats
        common                              SEQUENCE {
            dci-Format0-0-AndFormat1-0      SEQUENCE {
                ...
            }
            dci-Format2-0                   SEQUENCE {
                nrofCandidates-SFI          SEQUENCE {
                    ...
                },
                ...
            }
            dci-Format2-1
            dci-Format2-2
            dci-Format2-3                   SEQUENCE {
                dummy1
                dummy2
            }
        },
        ue-Specific                         SEQUENCE {
            dci-Formats
            ...,
        }
    }
}
```

The terminal may refer to configuration information defined in Table 13 below for UE-specific PDCCH monitoring.

TABLE 13

```
PDCCH-Config ::=    SEQUENCE {
    controlResourceSetToAddModList
        // At most three CORESETs are configured by referring to CORESET configuration
    controlResourceSetToReleaseList
    searchSpacesToAddModList
        // At most ten search spaces are configured by referring to search space configuration
```

TABLE 13-continued

```
searchSpacesToReleaseList
   downlinkPreemption   // downlink preemption indicator
   tpc-PUSCH            // configuraion of reception of a group TPC for PUSCH transmission
   tpc-PUCCH            // configuration of reception of a group TPC for PUCCH
transmission
   tpc-SRS              // configuration of reception of a group TPC for SRS transmission
   ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, QCL information on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread}.
QCL-Type B: including {Doppler shift, Doppler spread}
QCL-Type C: including {Doppler shift, average delay}
QCL-Type D: including {Spatial Rx parameters}

Figure 9:
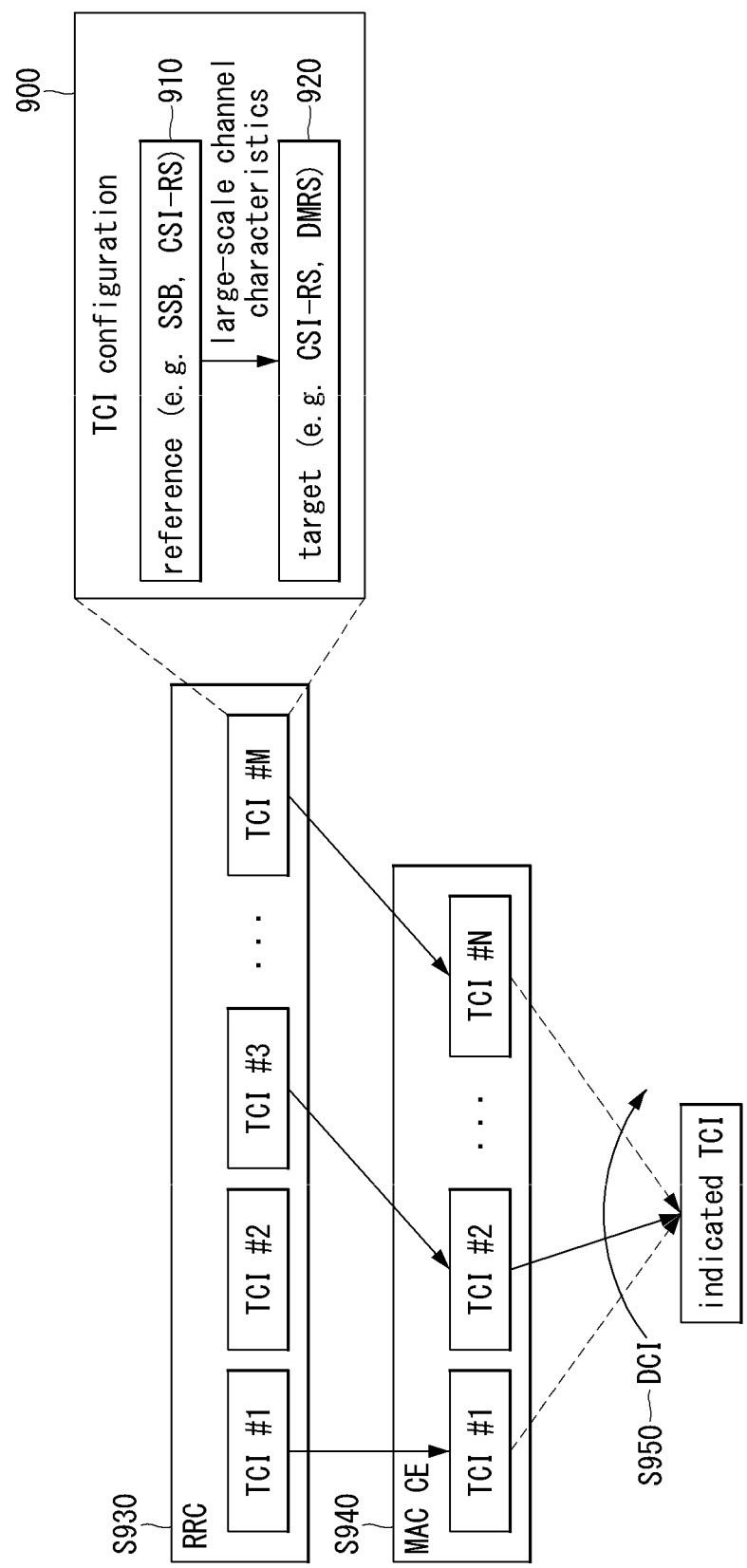
FIG. 9 is a conceptual diagram illustrating a first exemplary embodiment of a QCL information transfer process through TCI state configuration and indication.

FIG. 9 is a conceptual diagram illustrating a first exemplary embodiment of a QCL information transfer process through TCI state configuration and indication.

Referring to FIG. 9, in a process of transferring QCL information through TCI state configuration and indication, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration S900 may include information on a signal or channel (i.e., QCL reference S910) that provides large-scale channel characteristics to a signal or channel (i.e., QCL target S920) referring to the TCI. One TCI state configuration S900 may include up to two references (i.e., qcl-Type1 and qcl-Type2). In this case, the first reference may be one of the QCL-Type A, QCL-Type B, and QCL-type C (i.e., qcl-type1={QCL-type A, QCL-type B, QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal. Therefore, the base station may transmit an activation message for some of the TCIs configured through the RRC signaling to the terminal through L2 signaling such as a MAC CE (S940). In this case, the base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI 950 (S950). The terminal may apply QCL information indicated by the corresponding TCI at a predetermined timing after receiving the L1 signaling, and may perform a reception operation for the signal or channel.

The TCI state indication steps may include the RRC signaling S930, MAC CE signaling S940, and DCI signaling S950. Some of them may be partially omitted depending on a type of the QCL target RS. For example, the QCL target may be a PDSCH DMRS, and one or more TCI states are configured through RRC signaling. In this case, the base station may indicate the TCI state using all the steps of FIG. 9. On the other hand, the QCL target may be a PDSCH DMRS, and a single TCI state may be configured through RRC signaling. In this case, the MAC CE signaling S940 and the DCI signaling S950 may be omitted. Similarly, when the QCL target is a PDCCH DMRS, the DCI signaling S940 may be omitted. Specifically, the terminal may obtain configuration information for the TCI states and QCL information with reference to the RRC signaling of Table 14 below.

TABLE 14

```
TCI-State ::=              SEQUENCE { // TCI configuration (I.1-00)
   tci-StateId             // TCI state ID
   qcl-Type1               // first QCL reference configured by referring to QCL information
   qcl-Type2               // second QCL reference configured by referring to QCL information
   ...
}
QCL-Info ::=               SEQUENCE {
   cell                    // index of a cell in which QCL reference is transmitted
   bwp-Id                  // index of a BWP in which QCL reference is transmitted
   referenceSignal         CHOICE {
      csi-rs                  // index of a CSI-RS to be referred when QCL reference is a CSI-RS
      ssb                     // index of an SSB to be referred when QCL reference is an SSB
   },
   qcl-Type
      // QCL type to be applied to a QCL target (one of QCL-type A, QCL-type B, QCL-type C, and
```

TABLE 14-continued

QCL-type D)
...
}

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.
  TCI state activation/deactivation MAC CE for a UE-specific PDSCH DMRS
  TCI state indication MAC CE for a UE-specific PDCCH DMRS
  TCI state activation/deactivation MAC CE for an enhanced UE-specific PDSCH DMRS FIG. 10 is a conceptual diagram illustrating a structure of a TCI state activation/deactivation MAC CE for a UE-specific PDSCH DMRS.

Figure 10:
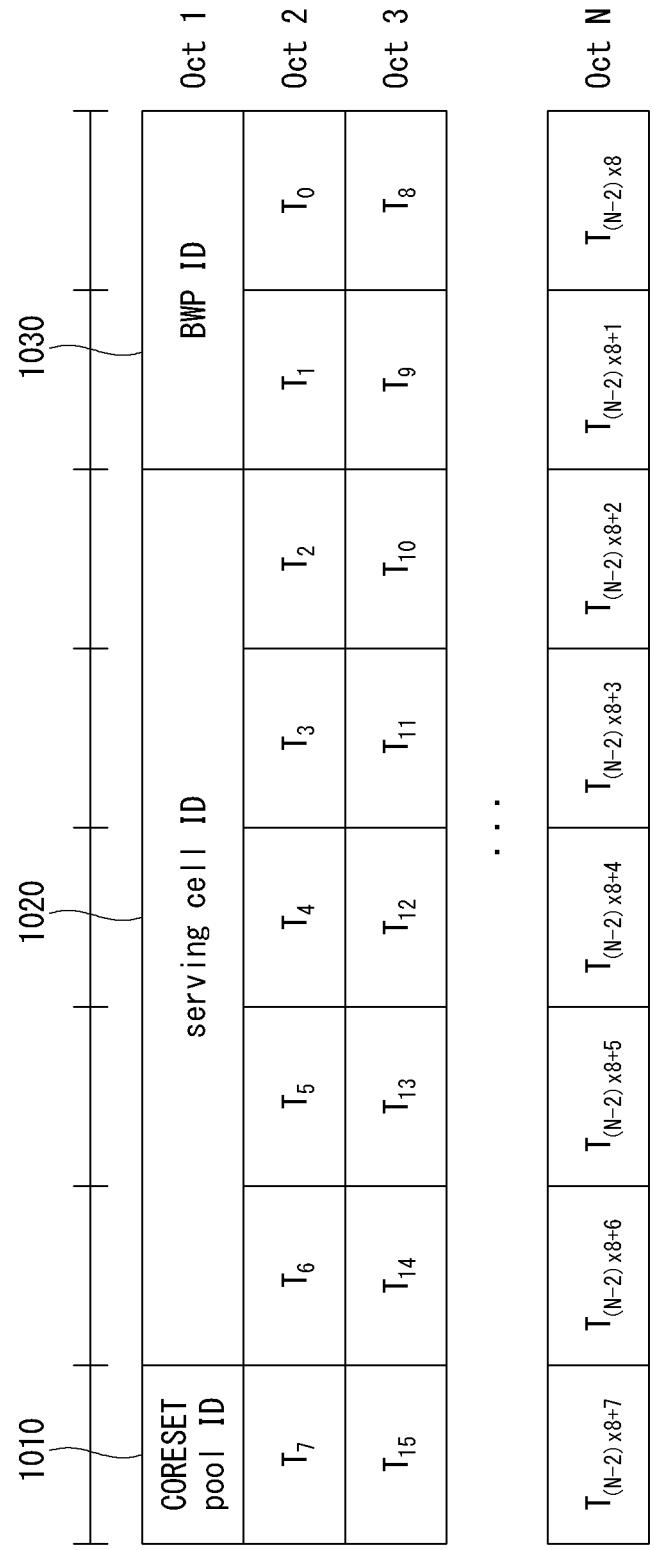
FIG. 10 is a conceptual diagram illustrating a structure of a TCI state activation/deactivation MAC CE for a UE-specific PDSCH DMRS.

Referring to FIG. 10, a MAC CE may indicate activation or deactivation of a TCI state for a UE-specific PDSCH DMRS. The first octet (Oct 1) in the MAC CE may include a COREST pool ID field 1010, a serving cell ID field 1020, and a BWP ID field 1030. The second octet (Oct 2) to the N-th octet (Oct N) may include Ti fields 1040 indicating TCI state IDs i. The detailed meaning of each field may be as follows, and the sizes thereof may be variable.
  Serving cell ID: a serving cell ID to which the MAC CE is applied
  BWP ID: BWP ID to which the MAC CE is applied, which indicates a BWP in association with a BWP indication field within the DCI
  Ti: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.
  CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, Ti indication may be applied only when a value of the CORESET pool ID matches a value of coresetPoolIndex of the CORESET.

Figure 11:
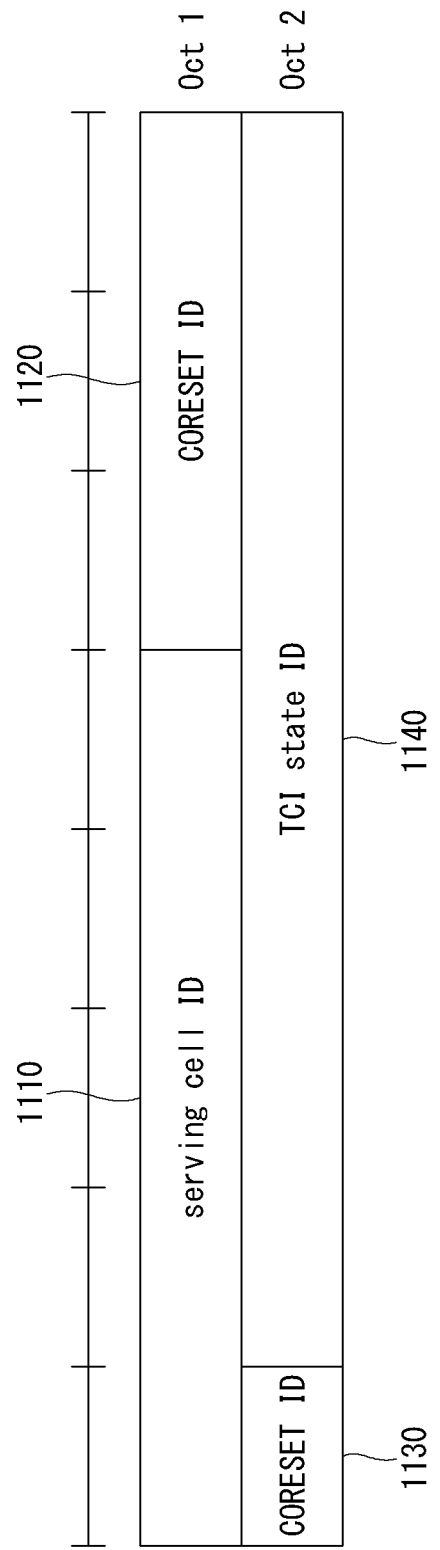
FIG. 11 is a conceptual diagram illustrating a first exemplary embodiment of a TCI state indication MAC CE for a UE-specific PDCCH DMRS.

Referring to FIG. 11, the first octet (Oct 1) in a TCI state indication MAC CE for a UE-specific PDCCH DMRS may include a serving cell ID field 1110 and a CORESET ID field 1120, and the second octet (Oct 2) of the MAC CE may include a CORESET ID field 1130 and a TCI state ID field 1140. The sizes thereof may be variable.
  Serving cell ID: a serving cell ID to which the corresponding MAC CE is applied.
  CORESET ID: indicates a CORESET to which the MAC CE is applied. If this value is set to 0, a CORESET configured through controlResourceSetZero may be a CORESET #0.
  TCI state ID: means a TCI state ID indicated by the corresponding MAC CE.

The base station may configure spatial relation information to the terminal through higher layer (e.g., RRC) signaling in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, the target RS may be an SRS. In this case, the base station may perform RRC configuration for each SRS resource based on Table 15 below.

TABLE 15

```
SRS-SpatialRelationInfo ::=    SEQUENCE {
    servingCellId              // index of a serving cell in which a reference RS is transmitted
    referenceSignal               CHOICE {
       ssb-Index               // SSB index when a reference RS is SSB
       csi-RS-Index            // CSI-RS resource index when a reference RS is CSI-RS
       srs                        SEQUENCE {
          resourceId           // SRS resource index when a reference RS is SRS
          uplinkBWP            // index of a UL BWP in which SRS is transmitted when a reference
RS is SRS
       }
    }
}
```

FIG. 11 is a conceptual diagram illustrating a first exemplary embodiment of a TCI state indication MAC CE for a UE-specific PDCCH DMRS.

For example, the target RS may be an SRS. In this case, the base station may perform RRC configuration for each SRS resource as in Tables 16 and 17 below.

TABLE 16

```
PUCCH-SpatialRelationInfo ::=        SEQUENCE {
  pucch-SpatialRelationInfoId    // spatial relation information ID for PUCCH
  servingCellId                  // index of a serving cell in which a reference RS is
transmitted
  referenceSignal                     CHOICE {
    ssb-Index                    // SSB index when a reference RS is SSB
    csi-RS-Index                 // CSI-RS resource index when a reference RS is CSI-RS
    srs                          // specifiy a SRS resource by referring to PUCCH-SRS
configuration
},
  pucch-PathlossReferenceRS-Id
    // index of a RS resource to be used for measurement of a pathloss of a PUCCH
  p0-PUCCH-Id    // index of confuring p0 for PUCCH power control
```

TABLE 17

```
  closedLoopIndex              // configuration value of closed-loop power control
}
PUCCH-SRS ::= SEQUENCE {
  resource                     // SRS resource index
  uplinkBWP                    // index of a BWP in which SRS is transmitted
}
```

In the 5G NR communication system, a slot format may include downlink symbol(s), uplink symbol(s), and/or flexible symbol(s).

Figure 12:
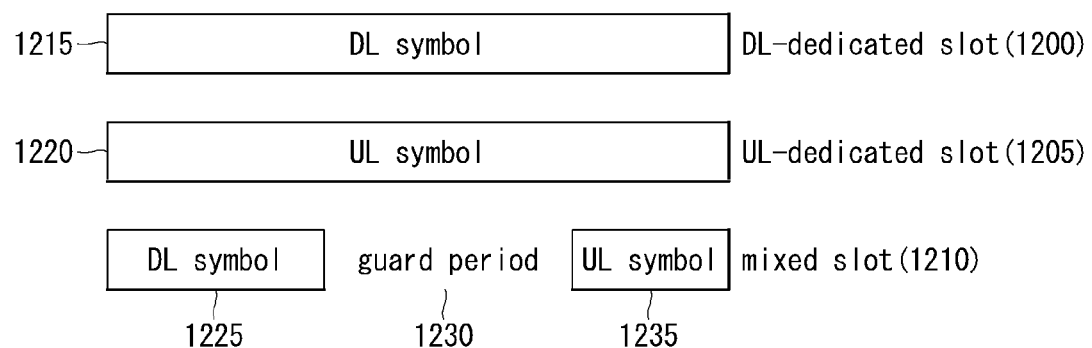
FIG. 12 is a conceptual diagram illustrating slot configurations according to slot formats in a communication system.

FIG. 12 is a conceptual diagram illustrating slot configurations according to slot formats in a communication system.

Referring to FIG. 12, a downlink dedicated slot 1200 may be a slot in which all symbols within the slot are configured only as downlink symbols 1215 according to a slot format. As another example, an uplink dedicated slot 1205 may be a slot in which all symbols within the slot are configured only as uplink symbols 1220 according to a slot format. As another example, in a downlink/uplink mixed slot 1210, some symbols within the slot may be configured as downlink symbols 1225, and some symbols within the slot may be configured as uplink symbols 1235 according to a slot format. In this case, specific symbols of the mixed slot 1210 including both the uplink and downlink symbols may be configured or indicated as a guard period 1230 for downlink-uplink switching, and the terminal may not perform transmission/reception during the guard period 1230.

In the 5G NR communication system, the base station may configure a 'per-slot slot format' over one or more slots for each serving cell to the terminal through a higher layer parameter (e.g., tdd-UL-DL-ConfigurationCommon). In this case, the higher layer parameter (e.g., tdd-UL-DL-ConfigurationCommon) may include or refer to at least one of the following information.

Reference subcarrier spacing: reference numerology $\mu_{ref}$
Pattern 1: A first pattern.
Pattern 2: A second pattern.
Here, the pattern 1 or pattern 2 may include at least one of the following configurations.
Slot configuration periodicity (i.e., dl-UL-Transmission-Periodicity): Slot configuration periodicity P expressed in units of msec
Number of downlink dedicated slots (i.e., nrofDownlinkSlots): The number $d_{slots}$ of slots composed only of downlink symbols
Number of downlink symbols (i.e., nrofDownlinkSymbols): The number $d_{sym}$ of downlink symbols
Number of uplink dedicated slots (i.e., nrofUplinkSlots): The number $u_{slots}$ of slots composed only of uplink symbols
Number of uplink symbols (i.e., nrofUplinkSymbols): The number $u_{sym}$ of uplink symbols The slot configuration periodicity P msec of the first pattern may include $S=P \cdot 2^{\mu_{ref}}$ slots, and in this case, the numerology may follow $\mu_{ref}$. In addition, among the S slots, the first $d_{slots}$ slots may include only downlink symbols, and the last $u_{slots}$ slots may include only uplink symbols. In this case, $d_{sym}$ symbols after first $d_{slots}$ slots may be downlink symbols. In addition, $u_{sym}$ symbols before last $u_{slots}$ slots may be uplink symbols. The remaining symbols (i.e., $(S-d_{slots}-u_{slots}) \cdot N_{symb}^{slot}-d_{sym}-u_{sym}$ symbols) that are not designated as downlink symbols or uplink symbols in the pattern may be flexible symbols.

If the second pattern is configured and the slot configuration periodicity of the second pattern is $P_2$, a slot configuration periodicity $P+P_2$ msec configured with a combination of the first pattern and the second pattern may include first $S=P \cdot 2^{\mu_{ref}}$ slots and second $S_2=P_2 \cdot 2^{\mu_{ref}}$ slots. In this case, the positions and numbers of downlink symbols, uplink symbols, and flexible symbols in the second pattern may be configured with reference to the description of the first pattern based on configuration information of the second pattern. In addition, when the second pattern is configured, the terminal may assume that $P+P_2$ is a divisor of 20 msec. The base station may override direction(s) of 'flexible symbol(s)' among symbols configured through the higher layer parameter (e.g., tdd-UL-DL-ConfigurationCommon) by using the higher layer parameter (e.g., tdd-UL-DL-ConfigurationDedicated) based on the following information.

Slot configuration set (i.e., slotSpecificConfigurationsToAddModList): A set of slot configurations
Slot index (i.e., slotindex): An index of a slot included in the set of slot configurations
Symbol directions (i.e., symbols): The directions of the symbols indicated by the slot index (i.e., slotindex). If all symbol directions are downlink (symbols=allDownlink), all symbols within the corresponding slot are downlink symbols. If all symbol directions are uplink (symbols=allUplink), all symbols within the corresponding slot are uplink symbols. If the symbol directions are explicit (symbols=explicit), nrof-DownlinkSymbols may indicate the number of downlink symbols located in the first part of the corresponding slot, and nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

In the 5G communication system, the base station may indicate a slot format to the terminal based on L1 signaling. For example, when the terminal receives a higher layer parameter SlotFormatIndicator from the base station, the terminal may obtain configuration information a slot format indication-RNTI (i.e., SFI-RNTI). Meanwhile, when the terminal receives a higher layer parameter dci-PayloadSize from the base station, the terminal may obtain configuration information of a payload size of the DCI format 2_0. In addition, the terminal may additionally receive, from the base station, information on PDCCH candidate(s), CCE aggregation level, and search space set(s) of a CORESET for monitoring the DCI format 2_0.

Each slot format indication (SFI) index field in the DCI format 2_0 may indicate a slot format to be applied to each slot in a slot set of a DL BWP and a UL BWP from a slot in which the terminal has detected the corresponding DCI format 2_0. In this case, the size of the slot set may be equal to or greater than a PDCCH monitoring periodicity of the DCI format 2_0. For example, the slot set may be composed of N slots. In this case, the DCI format 2_0 may include N SFI index fields, and each SFI index field may indicate a format value of Tables 18 and 19 below. In Tables 18 and 19, 'D' may mean a downlink symbol, 'U' may mean an uplink symbol, and 'F' may mean a flexible symbol.

TABLE 18

| Slot form at | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |

TABLE 19

| Slot form at | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | F | F | F | F | F | F | U | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | U | D | F | U | U | U | U | U |

TABLE 19-continued

| Slot form at | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 49 | D | D | D | D | F | F | U | D | D | D | D | F | F | U |
| 50 | D | D | F | F | U | U | U | D | D | F | F | U | U | U |
| 51 | D | F | F | U | U | U | D | F | F | U | U | U | U | |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines a slot format of a slot based on a higher layer parameter tdd-UL-DL-ConfigurationCommon or a higher layer parameter tdd-UL-DL-ConfigurationDedicated, and a detected DCI format (when exists). | | | | | | | | | | | | | |

The 5G NR communication system may be able to support flexible and dense wireless backhaul links for each cell through the IAB feature, without support of a wired network.

Figure 13:
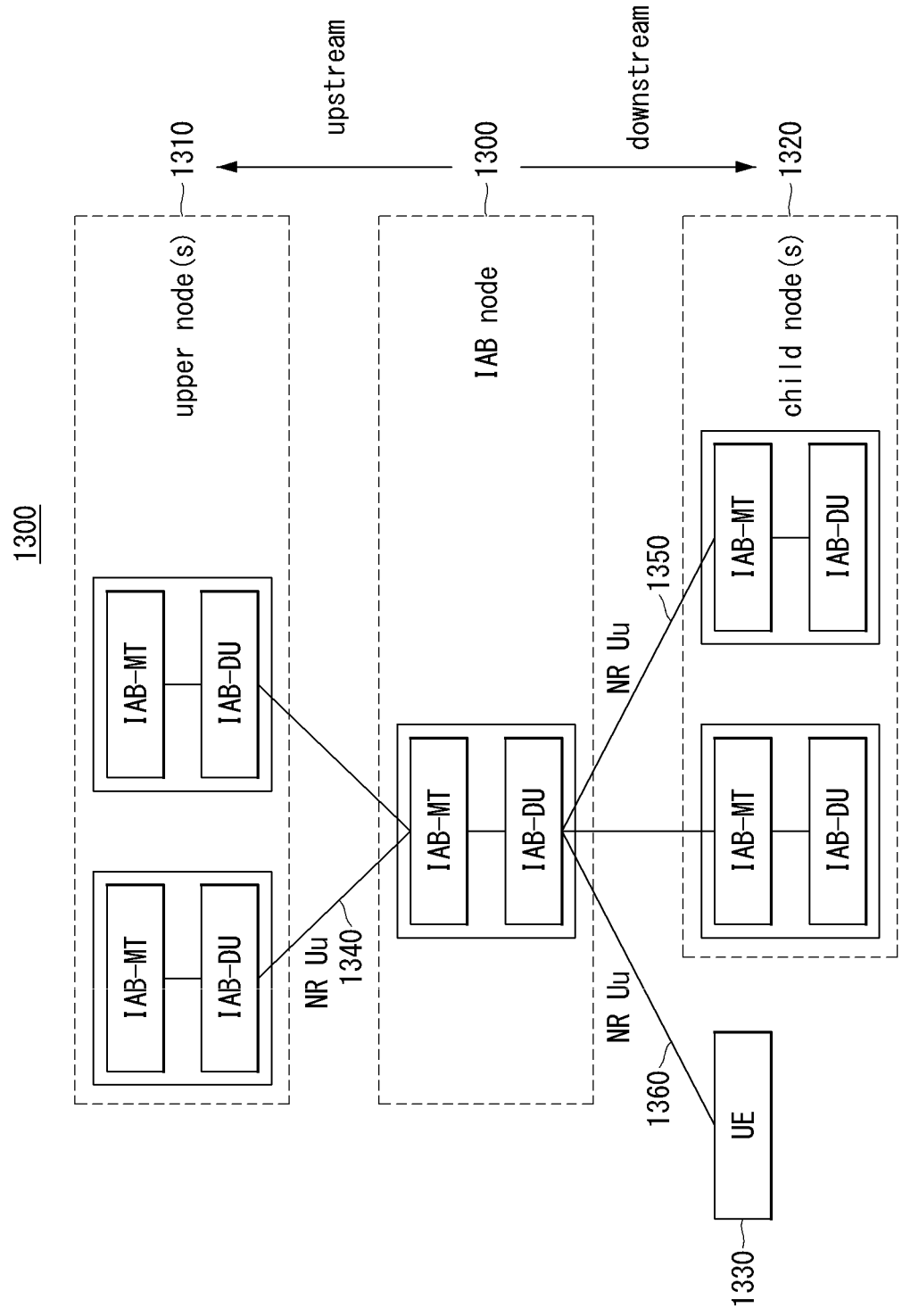
FIG. 13 is a conceptual diagram illustrating a first exemplary embodiment of an IAB network.

FIG. 13 is a conceptual diagram illustrating a first exemplary embodiment of an IAB network.

Referring to FIG. 13, an IAB network may include an IAB node 1300, upper nodes (e.g., parent/donor nodes) 1310 of the IAB node 1300, child nodes 1320 that are lower nodes of the IAB node 1300, a terminal (user equipment, UE) 1330, an NR Uu interface 1340 connecting the IAB node 1300 and the upper nodes 1310, an NR Uu interface 1350 connecting the IAB node 1300 and the child nodes 1320, and an NR Uu interface 1360 connecting the IAB node 1300 and the terminal 1330. Here, the IAB node 1300 may be considered as a type of relay/repeater configured based on a front-haul structure. The IAB node 1300 may be composed of two elements: IAB-DU and IAB-MT. In this case, the IAB node 1300 may communicate with the child node 1320 or the terminal 1330 using the IAB-DU. In this case, the child node 1320 or the terminal 1330 may recognize the corresponding IAB node 1300 as one cell (serving cell).

This may be because the IAB-DU of the IAB node 1300 and an IAB-MT of the child node 1320 or the terminal 1330 are connected through the NR Uu interfaces 1350 and 1360, each of which is an air interface between a base station and a terminal. Similarly, the IAB node 1300 may communicate with the upper node 1310 through the IAB-MT. The upper node 1310 may recognize the corresponding IAB node 1300 as one terminal. This may be because the IAB-MT of the IAB node 1300 and an IAB-DU of the upper node 1310 are connected through the NR Uu interface 1340 which is an air interface between a base station and a terminal.

The IAB node 1300 may have a structure in which a received signal is completely decoded and then re-encoded and amplified/transmitted. The IAB node 1300 may be classified as a type of regenerative relay. To this end, the IAB node 1300 may have a structure including L1 and L2 layers on a protocol stack (in some cases, it may include L3 layer or more), and may support a control plane (CP) and a user plane (UP) from the upper node 1310 to the terminal 1330.

Figure 14:
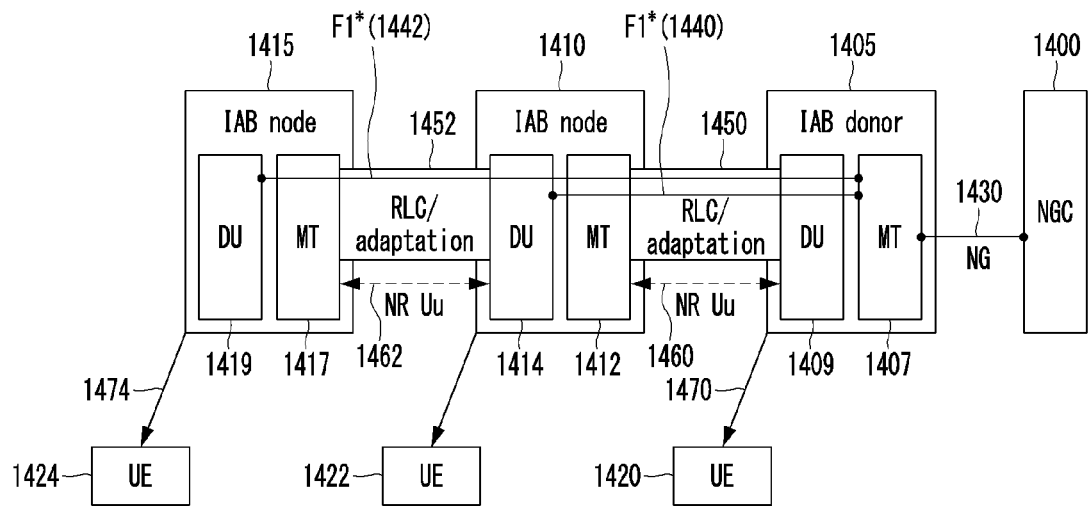
FIG. 14 is a block diagram illustrating a first exemplary embodiment of a split structure of a central unit (CU) and a distributed unit (DU) in an IAB network.

FIG. 14 is a block diagram illustrating a first exemplary embodiment of a split structure of a central unit (CU) and a distributed unit (DU) in an IAB network.

Referring to FIG. 14, a central unit (CU) and a distributed unit (DU) may be split in the IAB network. In such the split structure, IAB nodes 1410 and 1415 of a two-hop chain are connected to an IAB donor 1405. Each of the IAB nodes 1410 and 1415 and terminals 1420, 1422, and 1424 may be connected to a next generation core (NGC) 1400 in a stand-alone (SA) mode. The IAB nodes 1410 and 1415 may include one DU and one MT, respectively. A certain IAB node (e.g., 1415) may be connected to the parent IAB node 1410 or the IAB donor 1405 via an MT 1417. As another example, a certain IAB node (e.g., 1410) may establish an RLC channel in the MT 1417 of the child IAB node 1415 through a DU 1414. In this case, RLC channels 1450 and 1452 generated for the MTs 1412 and 1417 may additionally include some information for IAB operations in addition to components of the RLC channel for the terminal. As such, the RLC channels 1450 and 1452 may be collectively referred to as 'modified RLC*' because the contents thereof may be changed.

One IAB node may be connected to DU(s) of one or more parent IAB nodes or IAB donors. In this case, the IAB node may include a plurality of DUs. Each DU of the corresponding IAB node may have an F1-C connection 1440 or 1442 with a single IAB donor CU-CP. Even when the IAB node has a plurality of UP connections, it should be connected to a single IAB donor based on a single CP connection, and there should be no confusion in the operations of the IAB node.

The IAB donor 1405 may include DU(s) to support the MT of the terminal and child IAB nodes. The IAB donor 1405 may include a CU 1407 for itself and for DUs 1409, 1414, and 1419 of all child IAB nodes. It may be assumed that a certain IAB donor may have a single IAB donor. The IAB donor that manages the corresponding IAB donor may be changed by a topology adaptation function. A DU of a certain IAB node may be connected to a CU of an IAB donor through an F1 interface or a modified F1 interface (e.g., modified F1, F1*) 1440 or 1442. An F1*-user plane (U) may be operated on the RLC channels 1450 and 1452 between the corresponding IAB-MTs 1417 and 1412 and the DUs 1414 and 1409 of the parent IAB node or donor.

Hereinafter, in the present disclosure, for convenience of description, higher layer parameters or higher layer configurations may not be limited to the aforementioned L2 and L3 signaling. The higher layer parameters or higher layer configurations may include all information transmitted or configured through various interfaces such as the F1 interfaces 1440 and 1442, the NG interface 1430 (connecting CU and NGC), and the X2 interface.

The above-described slot format configuration and indication method may be seen as limited to the case of the terminal. However, the above-described slot format configuration and indication method may not be limited thereto, and may be applied to the case of the IAB DU and the IAB-MT. For example, for each serving cell of the IAB-DU, the corresponding IAB-DU may configure slot format information for each slot in a certain slot set by receiving a higher layer parameter for IAB-DU resource configuration (e.g., IAB-DU-Resource-Configuration). As another example, the IAB-MT may receive a 'per-slot slot format' over one or more slots for each serving cell through a higher layer parameter for IAB-MT dedicated slot format configuration (e.g., tdd-UL-DL-ConfigurationDedicated-IAB-MT).

The IAB-MT may receive the higher layer parameter for IAB-MT dedicated slot format configuration (e.g., tdd-UL-DL-ConfigurationDedicated-IAB-MT). In this case, the IAB-MT may replace the higher layer parameter (e.g., tdd-UL-DL-ConfigurationDedicated) for dedicated slot format configuration in the above-described slot format configuration and indication method. Specifically, the higher layer parameter for IAB-MT dedicated slot format configuration (e.g., tdd-UL-DL-ConfigurationDedicated-IAB-MT) may include the following information.

- IAB-MT slot configuration set (i.e., slotSpecificConfigurationsToAddModList-IAB-MT): A set of slot configurations
- Slot index (i.e., slotindex): Index of a slot included in the set of slot configurations
- IAB-MT symbol directions (i.e., symbols-IAB-MT): The direction of the slot indicated by the slot index.
  - If the IAB-MT symbol directions are all downlink (symbols-IAB-MT=allDownlink), all symbols within the corresponding slot are downlink symbols.
  - If the IAB-MT symbol directions are all uplink (symbols-IAB-MT=allUplink), all symbols within the corresponding slot are uplink symbols.
  - If the IAB-MT symbol directions are explicit (symbols-IAB-MT=explicit), the nrofDownlinkSymbols may indicate the number of downlink symbols located in the first part of the slot, and the nrofUplinkSymbols may indicate the number of uplink symbols located in the last part of the corresponding slot. nrofDownlinkSymbols or the nrofUplinkSymbols may be omitted. In this case, the corresponding parameter may be regarded as indicating a value of 0. The remaining symbols within the slot become flexible symbols.

Similarly to the above-mentioned normal terminal, the IAB-MT may also receive the DCI format 2_0, and through this, may receive configuration information of a slot format from the base station of the IAB-DU of the base station or parent node. The IAB-MT may receive the DCI format 2_0. In this case, candidate values of each SFI field may not be limited to the values shown in Tables 18 and 19. The candidate values of each SFI field may further include values shown in Tables 20 and 21.

TABLE 20

| Slot form at | Symbol number within a slot |  |  |  |  |  |  |  |  |  |  |  |  |  |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |

TABLE 20-continued

| Slot form at | Symbol number within a slot |  |  |  |  |  |  |  |  |  |  |  |  |  |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |

TABLE 21

| Slot form at | Symbol number within a slot |  |  |  |  |  |  |  |  |  |  |  |  |  |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | F | D | D | D |
| 82 | U | U | U | U | U | U | U | U | U | F | F | D | D | D |
| 83 | U | U | U | U | U | U | U | U | U | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | F | F | D | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | F | F | F | D | D | D | D | D | D | D | D | D |
| 93 | U | U | U | U | U | U | U | U | F | F | F | F | F | D |
| 94 | U | U | U | U | U | U | F | F | F | F | F | D | D | D |
| 95 | U | U | U | U | U | F | F | D | D | D | D | D | D | D |
| 96 | U | U | U | U | U | U | U | D | D | D | D | D | D | D |

The IAB-MT may receive, from the upper node, information on symbols not to be used for a certain serving cell through a higher layer parameter (e.g., Provided Guard Symbols MAC CE). The IAB-MT may perform a transition (i.e., operation change) between the LAB-MT and the IAB-DU of the IAB node during a time period including the symbols not used. Meanwhile, the base station may also signal a numerology for the symbols to the terminal through a higher layer parameter (e.g., Provided Guard Symbols MAC CE). In a cell of a certain IAB-DU, a symbol within a slot may be configured as one of three types: 'hard', 'soft', and 'unavailable (or not-available)'. If a certain downlink, uplink, or flexible symbol is configured as the hard type, the cell of the IAB-DU may perform a signal transmission, a signal reception operation, or one of signal transmission and signal reception in the corresponding symbol, respectively. This may mean that the fact that a certain symbol is configured as the hard type guarantees the reflection of the downlink, uplink, or flexible symbol configuration of the IAB-DU for the corresponding symbol.

Specifically, the 3GPP may provide an F1 application protocol (F1AP) signaling as shown in Table 22. The upper IAB node (e.g., IAB donor, parent node, core network, etc.) may configure a DU resource type of the lower IAB node (e.g., IAB node, child node) through this. Referring to Table 22, information of the DU resource type may include one HSNA slot configuration list. The one HSNA slot configuration list may consist of one or more HSNA slot configurations. In this case, one HSNA slot configuration list may include HSNA slot configurations according to the maximum number of HSNAs (e.g., maxnoofHSNA). The n-th HSNA slot configuration included in the HSNA slot configuration list may include information on whether to apply the hard type, soft type, or not-available type to each of downlink symbols, uplink symbols, and flexible symbols of the n-th slot according to an application periodicity and starting time of the HSNA slot configuration list.

TABLE 22

| IE/group name | range | IE type and reference | liminality |
|---|---|---|---|
| HSNA slot configuration list | 0 . . . 1 | | |
| >HSNA slot configuration item | 1 . . . <maxnoofHSNASlots> | | |
| >>HSNA (Downlink) | | Enumerated (H, S, NA) | HSNA value for a downlink symbol of a slot |
| >>HSNA (Uplink) | | Enumerated (H, S, NA) | HSNA value for a uplink symbol of a slot |
| >>HSNA (Flexible) | | Enumerated (H, S, NA) | HSNA value for a flexible symbol of a slot |

If a certain downlink, uplink, or flexible symbol is configured as the soft type, the IAB-DU cell may perform operations of a signal transmission, a signal reception, or one of signal transmission and signal reception in the symbol when at least one of the following conditions is satisfied.

Condition 1: The IAB-MT (co-located/associated with the IAB-DU) does not perform transmission or reception in the corresponding symbol.

Condition 2: The IAB-MT (co-located/associated with the IAB-DU) can perform transmission or reception in the corresponding symbol, but the transmission/reception operation of the IAB-MT does not change due to the use of the symbol at the IAB-DU.

Condition 3: The IAB-MT (co-located/associated with the IAB-DU) receives a DCI format 2_5 indicating the corresponding soft symbols as 'available'.

If a certain downlink, uplink, or flexible symbol is configured as the 'unavailable (or not-available (NA)) type', the IAB-DU (i.e., cell) may not perform transmission or reception in the symbol. The IAB-DU may transmit one of a cell-specific, periodic, or semi-static signal or channel included in the following list in symbol(s) of a certain slot. In this case, the IAB-DU may perform a transmission/reception operation by assuming that the corresponding symbol(s) in the corresponding slot are configured as the hard type regardless of the configured resource type.

SS/PBCH block, CSS set for a type0-PDCCH configured by a system information block 1 (SIB1) for PDCCH configuration (i.e., PDCCHs for a type0-PDCCH CSS sets configured by pdcchConfigSIB1), periodic CSI-RS, and/or the like The IAB-DU may receive one of a cell-specific, periodic, or semi-static signal or channel included in the following list in symbol(s) of a certain slot. In this case, the IAB-DU may perform a transmission/reception operation by assuming that the corresponding symbol(s) in the corresponding slot are configured as the hard type regardless of the configured resource type.

PRACH, scheduling request (SR)

Following information may be configured for each cell in the set of cells of the IAB-DU.

IAB-DU cell identifier (i.e., iabDuCellId-AI): Identifier of the IAB-DU cell

AI position within DCI format (i.e., positionInDCI-AI): Position of an availability identifier (AI) index field within the DCI format 2_5.

Availability combinations (i.e., availabilityCombinations): includes a list of the following two pieces of information for availability combinations.

Resource availability (i.e., resourceAvailability): indicates resource availability for soft symbols included in one or more slots of the IAB-DU cell. The availability of soft symbols within one slot may be determined by referring to values in Table 23.

Availability combination identifier (i.e., availabilityCombinationId): indicates a mapping between the resource availability (i.e., resourceAvailability) and the AI index field in the DCI format 2_5.

As described above, in the DCI format 2_5, one AI index field may indicate to the IAB-DU the availability of soft symbols included in each slot in a certain slot set. The slot set may start from the earliest slot among the slots of the IAB-DU overlapping in the time domain with the slot in which the IAB-MT detects the corresponding DCI format 2_5. In addition, the size of the slot set may be greater than or equal to a PDCCH monitoring periodicity of the DCI format 2_5 given from a higher layer parameter SearchSpace. The AI index field of the DCI format 2_5 may include max $\{\lceil\log_2(\text{maxAIindex})\rceil, 1\}$ bits. The AI index field of the DCI format 2_5 may be mapped to one of the values of Table 23. In this case, the maximum value of the AI index (i.e., maxAIindex) may mean a maximum value among the provided availability combination identifiers (i.e., availabilityCombinationId). Table 25 may indicate a mapping relationship between the resource availability value and the soft symbol type within one slot.

TABLE 23

| Value | Indication |
|---|---|
| 0 | No indication of availability for soft symbols |
| 1 | Indicates that downlink symbols are available. No indication of availability for uplink and flexible soft symbols |
| 2 | Indicates that uplink symbols are available. No indication of availability for downlink and flexible soft symbols |
| 3 | Indicates that downlink and uplink soft symbols are available. No indication of availability for flexible soft symbols |
| 4 | Indicates that flexible soft symbols are available. No indication of availability for downlink and uplink soft symbols |
| 5 | Indicates that downlink and flexible soft symbols are available. No indication of availability for uplink soft symbols |
| 6 | Indicates that uplink and flexible soft symbols are available. No indication of availability for downlink soft symbols |
| 7 | Indicates that downlink, uplink, and flexible soft symbols are available |

As described above, the upper IAB node including the IAB donor may indicate whether the lower IAB node uses the soft symbols based on the DCI format 2_5 and the contents of Table 23. On the other hand, the IAB node may be designed to operate in a half-duplex manner. In other words, the MT and DU of the IAB node may be designed to operate in a time division multiplexing (TDM) scheme. TS38.473 specification of the 3GPP may provide the F1AP signaling as shown in Table 24. Through this, the IAB node may report or deliver, to the upper IAB node (e.g., IAB donor or parent node), multiplexing information on a multiplexing capability between the IAB-DU of the IAB node (or, cell of a gNB-DU) and the IAB-MT of the IAB node (or, a cell configured in a co-located IAB-MT). Referring to Table 24, the multiplexing information may include one IAB-MT cell list composed of information on one or more IAB-MT cells. In this case, one IAB-MT cell list may include IAB-MT cell information according to the maximum number of serving cells (i.e., maxnoofServingCells). The n-th IAB-MT cell information included in the IAB-MT cell list may include a NR cell identity (ID) information of the corresponding cell and information on whether the following four types of multiplexing are supported.

> DU_RX/MT_RX multiplexing: informs whether the IAB node supports simultaneous receptions in the DU and the MT
> 
> DU_TX/MT_TX multiplexing: informs whether the IAB node supports simultaneous transmissions in the DU and the MT
> 
> DU_TX/MT_RX multiplexing: informs whether the IAB node can simultaneously perform transmission in the DU and reception in the MT
> 
> DU_RX/MT_TX multiplexing: informs whether the IAB node can simultaneously perform reception in the DU and transmission in the MT may include configuration information on (downlink/uplink/flexible (D/U/F)) slots and symbols for a cell (or cell group) of the IAB-DU.

The higher layer IAB-DU resource configuration information may include type (i.e., hard, soft, or not-available) information of the IAB-DU resources configured by the upper IAB node. The higher layer IAB-DU resource configuration information may include a part or all of cell-specific/semi-static downlink signals and channels such as SSB(s), type 0-PDCCH CSS set configured by a SIB1 for PDCCH configuration, CSI-RS, etc. configured in a cell (or cell group) configured to the IAB-DU. The higher layer IAB-DU resource configuration information may include a part or all of cell-specific/semi-static uplink signals and channels such as PRACH, SR, etc. configured in a cell (or cell group) configured to the IAB-DU.

In addition to the above-described higher layer configuration, the IAB node may receive at least one of a physical layer (L1 signaling) IAB-MT resource indicator and a physical layer IAB-DU resource indicator from the upper IAB node (S1510). As an example, the physical layer IAB-MT resource indicator may be a DCI format 2_0 including a slot format indicator for a cell (or a set of cells) which is configured to the IAB-MT. As another example, the physical layer IAB-DU resource indicator may be a DCI format 2_5 including a soft resource AI of the IAB-DU.

TABLE 24

| IE/group name | range | IE type and reference | liminality |
|---|---|---|---|
| IAB-MT cell list | 1 | | |
| >IAB-MT cell item | 1 ... <maxnoofServingCells> | | |
| >>NR cell identity | | Bit string (size: 36) | Identity of a serving cell configured for a co-located IAB-MT |
| >>DU_RX/ MT_RX | | Enumerated (supported, not-supported) | Indicates whether the IAB node supports simultaneous receptions in DU and MT |
| >>DU_TX/ MT_TX | | Enumerated (supported, not-supported) | Indicates whether the IAB node supports simultaneous transmissions in DU and MT |
| >>DU_TX/ MT_RX | | Enumerated (supported, not-supported) | Indicates whether the IAB node simultaneously supports transmission in DU and reception in MT |
| >>DU_RX/ MT_TX | | Enumerated (supported, not-supported) | Indicates whether the IAB node simultaneously supports reception in DU and transmission in MT |

According to Table 24, the IAB node may semi-statically report DU/MT multiplexing capability or whether simultaneous DU/MT operation is applicable for each cell. Whether to apply simultaneous DU/MT operation to the corresponding IAB node may depend entirely on the corresponding IAB node. The upper IAB node may not support controlling the simultaneous DU/MT operation of the lower IAB node dynamically or semi-statically depending on a situation.

Figure 15:
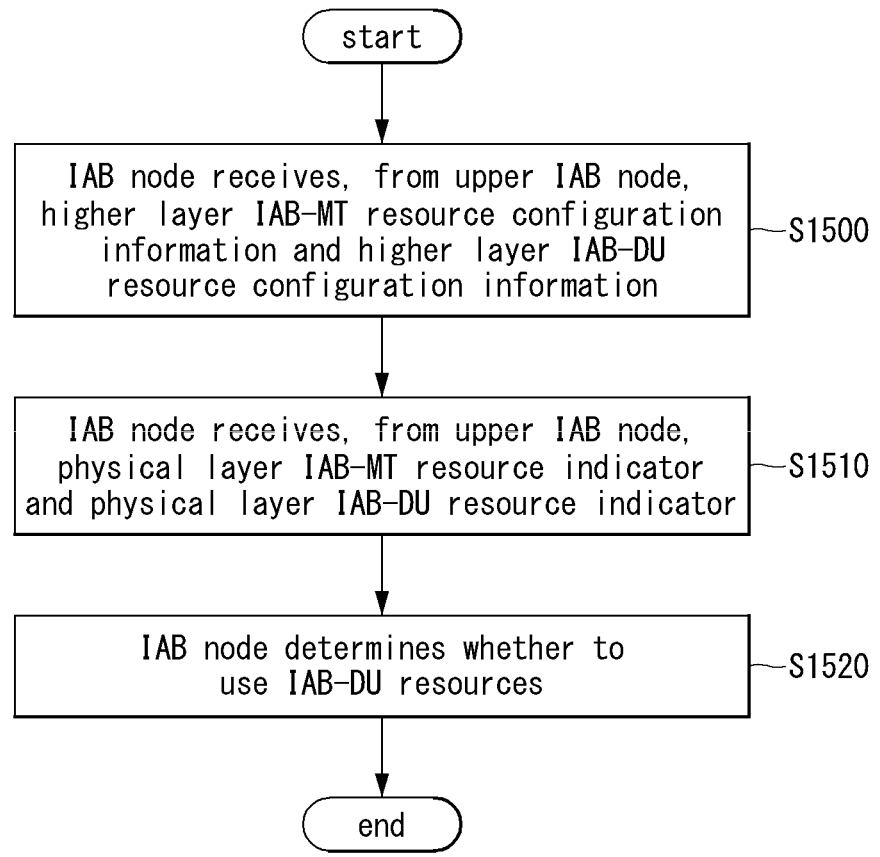
FIG. 15 is a flowchart illustrating a first exemplary embodiment of a procedure for determining whether an IAB node uses an IAB-DU resource.

FIG. 15 is a flowchart illustrating a first exemplary embodiment of a procedure for determining whether an IAB node uses an IAB-DU resource.

Referring to FIG. 15, in the order of determining whether to use the IAB-DU resources of the IAB node, the IAB node may identify whether the corresponding IAB-DU resources are available. In order to determine whether to use the IAB-DU resources, the IAB node may receive, from the upper IAB node, at least one of higher layer IAB-MT resource configuration information and higher layer IAB-DU resource configuration information (S1500). As an example, the higher layer IAB-MT resource configuration information may include configuration information on (downlink/uplink/flexible (D/U/F)) slots and symbols for a cell (or cell group) of the IAB-MT. As another example, the higher layer IAB-DU resource configuration information Finally, the IAB node may finally determine whether to use the IAB-DU resources based on the higher layer signaling (S1500) and the L1 signaling (S1510) (S1520).

Meanwhile, in general, it may not be possible to force all terminals to implement the same feature. The UE capability report may enable an expensive terminal to implement a large amount of features with high performance, and may enable a low-cost terminal to implement a small amount of features with low performance. The UE capability report may make it possible to secure the degree of freedom in terminal implementation for various situations. In addition, when the capability information is reported to the network, the base station may configure each function within the limits supported by each terminal. Certain functions may be promised to be mandatory for all terminals to implement, and in this case, it may be possible to omit the UE capability report for the mandatory functions.

It may be possible for the terminal to perform UE capability reporting of different values for one function for each frequency band or for each duplex scheme. For example, the terminal may support a specific function for a frequency range 1 (FR1), which means a band below 6 GHz, but may report to the base station that the terminal does not support a specific function for a frequency range 2 (FR2), which means a band above 6 GHz. As another example, the terminal may report to the base station that a specific function is supported in the TDD scheme but not supported in the FDD scheme.

When the terminal performs the UE capability reporting, the base station may follow the content of the UE capability report when performing configuration, indication, or scheduling for the terminal. If the base station indicates, to the terminal, configuration, indication or scheduling contrary to the UE capability report, the terminal may ignore it.

Figure 16:
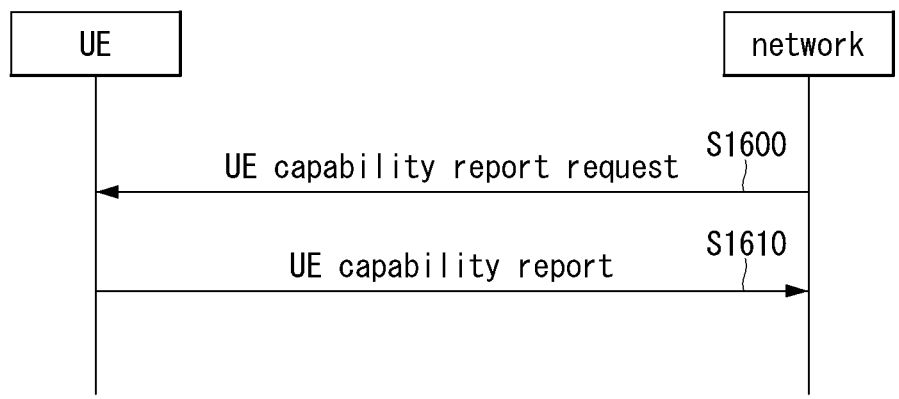
FIG. 16 is a sequence chart illustrating a first exemplary embodiment of a UE capability reporting procedure.

FIG. 16 is a sequence chart illustrating a first exemplary embodiment of a UE capability reporting procedure.

Referring to FIG. 16, in the UE capability reporting procedure, the base station may transmit a UE capability report request signal to the terminal when the terminal is in the RRC connected mode (i.e., RRC_CONNECTED state) (S1600). In this case, the base station may transmit the UE capability report request signal to the terminal through a higher layer parameter (e.g., UECapabilityEnquiry) for UE capability reporting request. In addition, the network may refer to only the UE capability report after access stratum (AS) security activation, and may not retransmit or report the UE capability report before the AS security activation to the core network (CN). The terminal may receive the UE capability report request signal. The terminal may compile UE capability information according to a specific procedure. The terminal may report the UE capability information to the base station through a UE capability information signal (e.g., UECapabilityInformmation) (S1610).

The specific procedure for compiling the UE capability information signal may include a procedure of generating a list (i.e., supportedBandCombinationList) of band(s) or band combination(s) (BC(s)) supported by the terminal, feature set (FS) information related to feature sets supported by the terminal, or feature set combination (FSC) information related to feature set combinations supported by the terminal. For example, when the base station requests a UE capability report from the terminal in order to obtain information on band(s) or band combination(s) supported by the terminal, the base station may request the terminal to report which band(s) it supports for each radio access technology (RAT). To this end, the base station may set a RAT-type in a UE RAT capability report request signal (e.g., UE-CapabilityRAT-Request), which is included in a UE RAT capability report request list signal (e.g., ue-CapabilityRAT-RequestList) that is a higher layer message, to 'nr', 'eutra-nr', 'eutra', or 'eutra-fdd'. This may mean that the base station may request a UE capability report for one or more RATs or RAT combinations from the terminal. In this case, the terminal may respond to each request for a list of supported bands for a plurality of RATs or RAT combinations. For example, the RAT-type may be set to 'nr'. In this case, the terminal may include a list of bands or band combinations to which NR-DC can be applied in the UE capability report. As another example, the RAT-type may be set to 'eutra-nr'. In this case, the terminal may include a list of bands or band combinations to which multi-RAT DC (MR-DC) such as EN-DC, NGEN-DC, NE-DC, or the like is applicable in the UE capability report. In addition, when the base station requests a UE capability report from the terminal, the base station may provide, to the terminal, a list of bands for which the terminal determines whether support is provided, through a higher layer parameter (e.g., frequencyBandListFilter) for band list filtering. For the bands included in the higher layer parameter (e.g., frequencyBandListFilter) for band list filtering, the terminal may determine a candidate band combination by considering 'predetermined RAT types supported for each band', 'information on RAT-types requested by the base station', etc., and may include the candidate band combination in the UE capability report.

In the 5G communication system, the base station may provide information related to a transmission power of each downlink channel or signal for the purpose of improving channel or signal reception and quality measurement accuracy of the terminal and reducing implementation complexity. The information on the transmission power may explicitly inform a transmission power value of a certain signal or channel. Alternatively, the information on the transmission power may be informed through implicit signaling schemes that inform a ratio between transmission powers of two different channels or signals.

Figure 17:
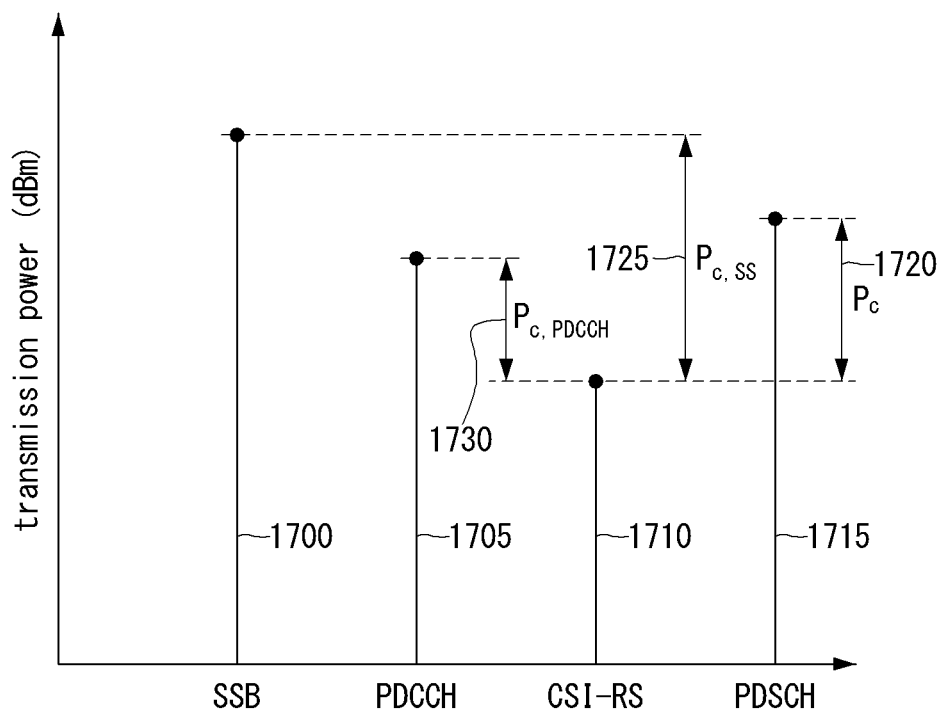
FIG. 17 is a graph illustrating transmission powers of NR downlink channels and signals.

FIG. 17 is a graph illustrating transmission powers of NR downlink channels and signals.

Referring to FIG. 17, a graph showing the transmission powers of the NR downlink channels and signals may show an SSB transmission power 1700, a PDCCH transmission power 1705, a CSI-RS transmission power 1710, and a PDSCH transmission power 1715. In addition, the graph may show a PDSCH relative transmission power $P_c$ 1720 which is a difference of a PDSCH energy per resource element (EPRE) with respect to a CSI-RS EPRE, an SSB relative transmission power $P_{c,SS}$ 1725 which is a difference of an SSB EPRE with respect to the CSI-RS EPRE, and a PDCCH relative transmission power $P_{c,PDCCH}$ 1730 which is a difference of a PDCCH EPRE with respect to the CSI-RS EPRE. The graph showing the transmission powers of the NR downlink channels and signals shows only one downlink channel or signal for each type, but this is for convenience of description, and in actual applications, a plurality of channels or signals having different powers may exist.

The base station may configure the SSB transmission power 1700 to the terminal through a higher layer parameter (e.g., ss-PBCH-BlockPower) for SSB transmission included in a serving cell common configuration signal (e.g., ServingCellConfigCommon). As another method, the base station may inversely calculate the SSB transmission power 1700 based on a reception power of the SSB obtained through RSRP measurement and a pre-measured pathloss value. In the 5G system, the base station may configure differences in the transmission powers of downlink channels and signals to the terminal through the following three parameters.

PDSCH relative transmission power parameter $P_c$ 1720: The PDSCH relative transmission power parameter $P_c$ may mean a difference of the PDSCH EPRE with respect to the CSI-RS EPRE (i.e., assumed difference between the PDSCH EPRE and a NZP CSI-RS EPRE when the terminal derives a CSI feedback). The PDSCH relative transmission power parameter $P_c$ may be configured for each CSI-RS resource configuration through a higher layer parameter for a power control offset (e.g., powerControlOffset), and may indicate values between-8 and 15 dB at 1 dB intervals. For example, a $P_c$ value configured for a certain CSI-RS resource may be 0 dB. In this case, an EPRE of an RE through which the corresponding CSI-RS is transmitted may be the same as an EPRE of an RE through which the PDSCH is transmitted. As another example, a $P_c$ value configured for a certain CSI-RS resource may be −3 dB. In this case, an EPRE of an RE through which the CSI-RS is transmitted may be twice (e.g., 3 dB) larger than an EPRE of an RE through which the PDSCH is transmitted.

SSB relative transmission power parameter $P_{c,SS}$ 1725: The SSB relative transmission power parameter $P_{c,SS}$ may mean a difference of the CSI-RS EPRE with respect to the EPRE of the SS/PBCH block (i.e., SSB) (i.e., an assumed difference between the SS/PBCH block EPRE and the NZP CSI-RS EPRE). The SSB relative transmission power parameters $P_{c,SS}$ may be configured for each CSI-RS resource configuration through a higher layer parameter for an SSB power control offset (e.g., powerControlOffsetSS). For example, a $P_c$ value configured for a certain CSI-RS resource may be 0 dB. In this case, an EPRE of an RE through which the CSI-RS is transmitted may be the same as an EPRE of an RE through which the SSB is transmitted. As another example, a $P_c$ value configured for the certain CSI-RS resource may be −3 dB. In this case, an EPRE of an RE through which the CSI-RS is transmitted may be twice (i.e., 3 dB) smaller than an EPRE of an RE through which the SSB is transmitted.

PDCCH relative transmission power parameter $P_{c,PDCCH}$ 1730: The PDCCH relative transmission power parameter $P_{c,PDCCH}$ may mean a difference between the CSI-RS EPRE and the PDCCH EPRE (i.e., assumed difference between the NZP CSI-RS EPRE and the PDCCH EPRE or assumed difference between the PDCCH EPRE and the NZP CSI-RS EPRE). The terminal may be promised to assume that the value of $P_{c,PDCCH}$ is 0 dB without special signaling. That is, the terminal may assume that the PDCCH EPRE and the CSI-RS EPRE are the same value.

Through the method in Table 24, the IAB node may report information on the simultaneous transmission/reception capability of IAB-DU and IAB-MT to upper nodes (e.g., parent node, IAB-CU, IAB donor, etc.). However, it can be seen that the IAB node is targeted as a DU/MT half-duplex IAB node that does not have simultaneous transmission/reception capability for supporting all specifications other than D/U/F resource configuration. This may cause the following problems when the IAB node performs simultaneous DU/MT transmission/reception.

The first problem is that a specific DU/MT simultaneous transmission/reception pattern may be determined as an error according to the conventional specification. For example, for data transmission/reception between the IAB-DU and the terminal, a link direction of a slot (hereinafter may be referred to as 'DL access slot') configured to the IAB-DU of the IAB node and the terminal may be downlink. In this case, it may be natural for the IAB-DU to transmit data to the terminal. However, when the IAB-MT performs transmission, it may be determined as an error according to the specification.

As another example, a slot (hereinafter may be referred to as 'UL access slot') configured to the IAB-DU of the IAB node and the terminal for data transmission/reception between the IAB-DU and the terminal may be uplink. In this case, it may be natural for the terminal to perform transmission to the IAB-DU. In addition, since the IAB-MT may be affected by such the transmission direction, it may be natural to perform transmission to an upper node. However, when a UL access slot is configured to the IAB node, it may be determined as an error by the specification that the IAB-DU, which is treated as a base station, transmits data to the terminal in the corresponding slot. The second problem is that, when the IAB node performs simultaneous transmission and reception operation, self-interference that suffers a path loss of a small magnitude compared to the access link may deteriorate a communication capacity of the IAB backhaul link. For example, when the IAB-DU uses a transmission power of about 43 dBm, assuming that a shielding between DU/MT is about 70 to 80 dB, interference of about-40 dBm or more may remain. Such the interference may have a non-negligible effect on the reception performance of the IAB-MT.

Meanwhile, in the IAB node, at least one of DU and MT may perform transmission in four DU/MT multiplexing modes (i.e., DU_RX/MT_RX, DU_TX/MT_TX, DU_TX/MT_RX, DU_RX/MT_TX) for simultaneous DU/MT operations. In this case, the IAB node may be associated with a DL access slot or a UL access slot according to at least one of the following four cases.

Case #1: This may be a case in which the IAB-MT transmits an uplink signal or channel in one or more UL access slots. Such the case may coincide with the base station/terminal operation defined by the specification.

Case #2: This may be a case in which the IAB-MT transmits an uplink signal or channel in one or more DL access slots. Such the case may be divided into the following two sub-cases according to a method in which the upper node of the IAB node configures a transmission direction of the slot to the terminal and the IAB-MT.

Sub-case #2-1: The upper node of the IAB node may configure or indicate a slot transmission direction as uplink (U) for the IAB-MT for a given time period, that is, one or more OFDM symbols or slots. In addition, this may be a case in which the upper node of the IAB node configures or indicates downlink (D) to the terminal. As an example, when a slot transmission direction configured for a given time period by a higher layer parameter for common slot format configuration is flexible, the upper node of the IAB node may reconfigure the slot transmission direction as uplink (U) for the IAB-MT by using a dedicated slot format configuration parameter or a slot format configuration parameter dedicated for the IAB-MT. In addition, the upper node of the IAB node may reconfigure a time period for which a slot transmission direction configured by a common slot format configuration higher parameter is flexible as downlink for the terminal by using a dedicated slot format configuration parameter. On the other hand, such the configuration or indication may have a disadvantage in violating the group special mobile association (GSMA) recommendation, which recommends matching TDD D/U directions in the same network or between different networks within one time point. This may cause problems for geographically adjacent networks in the same frequency band or other networks in the same geographic area using adjacent frequencies, that follow the GSMA recommendation.

Subcase #2-2: This may be a case in which the upper node reconfigures the slot transmission direction as downlink for the terminal and the IAB-MT when the slot transmission direction configured to the IAB node for a given time period is flexible. In such the sub-case, since the IAB-MT does not determine the corresponding slot as a valid UL slot or symbols, the uplink transmission operation may not be performed.

Case #3: This may be a case in which the IAB-DU transmits a downlink signal or channel in one or more UL access slots. In this case, a slot transmission direction for the IAB-MT in a given time period, that is, one or more OFDM symbols or slots, may be configured or indicated as uplink. On the other hand, this may be a case in which the IAB-DU configures or indicates the slot transmission direction of the serving cell supported by the DU as downlink. As described above, the IAB-DU may configure or indicate the transmission direction of the serving cell as downlink. In this case, the IAB-DU may perform an operation allowed by the specification only if it does not affect the operation of the IAB-MT. However, the serving cell supported by the IAB-DU may be configured or indicated as downlink. Such the operation may be the operation not conforming to the above-mentioned GSMA recommendation. In addition, when a serving cell supported by the IAB-DU is configured or indicated as downlink, it may interfere with a geographically adjacent network of the same frequency band or other networks in the same geographic area using an adjacent frequency. Therefore, when configuring or indicating the serving cell supported by the IAB-DU as downlink, a method for reducing interference to the geographically adjacent network of the same frequency band or other networks in the same geographic area using an adjacent frequency may be required.

Case #4: This may be a case in which the DU of the IAB node transmits a downlink signal or channel in the DL access slot of the MT of the IAB node. Such the case may coincide with the base station/terminal operation defined by the specification.

Cases #1 to #4 described above may not be mutually exclusive and may be appropriately combined as needed. As an example, when desiring to minimize the specification/implementation change for DU transmission in the DU_TX/MT_TX multiplexing environment, the IAB node may simultaneously apply Case #2 and Case #4 based on a DL access slot. As another example, when desiring to minimize the specification/implementation change for MT transmission in the DU_TX/MT_TX multiplexing environment, the IAB node may simultaneously apply Case #1 and Case #3 based on a UL access slot.

Meanwhile, since Case #2 (including Sub-case #2-1 and Sub-case #2-2) and Case #3 may cause self-interference, at least one of the following solutions may be applied to solve the self-interference problem.

Method 1-1: Considering the case where the symbol or slot of the IAB-MT is configured/indicated as uplink (U) as in Sub-case #2-1 or Case #3, the IAB upper node may configure a guard period applicable to an uplink slot of the IAB-MT of the IAB node, a child node of the IAB node, or the terminal. Such the guard period may be defined in a form in which transmission of an uplink channel or signal is restricted in units of symbols or slots, such as guard symbols. Alternatively, the guard period may be defined depending on at least one of a CSI-RS, a CORESET, a search space, or a combination of a CORESET and a search space. Alternatively, the guard period may be achieved by restricting transmission of an uplink channel or signal such as SRS, PUCCH, PRACH, etc. with a combination of one or more RE patterns.

In addition, the guard period may be achieved by allowing it to be recognized as RE-level rate matching resources for PUSCH transmission. That is, the IAB-MT may perform RE mapping and transmission by excluding the corresponding resources during PUSCH transmission. Specifically, in Sub-case #2-1, when the IAB-MT transmits an uplink signal, the guard period may protect a downlink signal of the terminal to ensure the reception performance of the terminal. Similarly, in Case #3, the guard period may allow the IAB-DU to adjust an uplink resource mapping of the IAB-MT in consideration of downlink signal transmission, thereby improving both the performance of the terminal for receiving signals of the IAB-DU and the performance of the upper node for receiving signals of the IAB-MT. As such, the guard period may be applied to uplink in a scheme similar to the scheme of performing rate matching based on the CSI-RS RE pattern during the PDSCH RE mapping.

Method 1-2: The upper node may configure/indicate a symbol or slot of the IAB-MT as downlink (D) as in Sub-case #2-2. In this case, signaling allowing the IAB-MT to perform uplink transmission may be performed. The upper node may perform signaling allowing the IAB-MT to perform uplink transmission in a downlink symbol or slot based on at least one layer of L1, L2, and L3. Method 1-2 may be understood as notifying the IAB node that the upper node of the IAB node that has received a transmission request from the IAB node has the capability of performing simultaneous transmission and reception.

As an example, one of the rows of Table 24 may be delivered to a lower node through independent signaling. In this case, simultaneous DU/MT transmission/reception according to the corresponding signaling may be limited to be performed only within a specific time/frequency resource that includes the corresponding signaling or is limited through another independent signaling. This may be for the upper node to adjust implementation complexity and power/computational resource consumption according to a situation.

Method 1-3: This may be a method in which the upper node restrictedly allows simultaneous transmission and reception only for a case where the IAB-DU applies downlink power control, in consideration of simultaneous transmission and reception including transmission of the IAB-DU as in Case #3. Such the restricted allowance may be promised to be implicitly determined according to whether downlink power control is applied (i.e., simultaneous transmission and reception may be allowed in a case where downlink power control is applied, and simultaneous transmission and reception may not be allowed in a case where downlink power control is not applied). Alternatively, the restricted allowance may be explicitly indicated to the IAB node by the upper node through an independent higher layer parameter or L1 signaling.

Figure 18A:
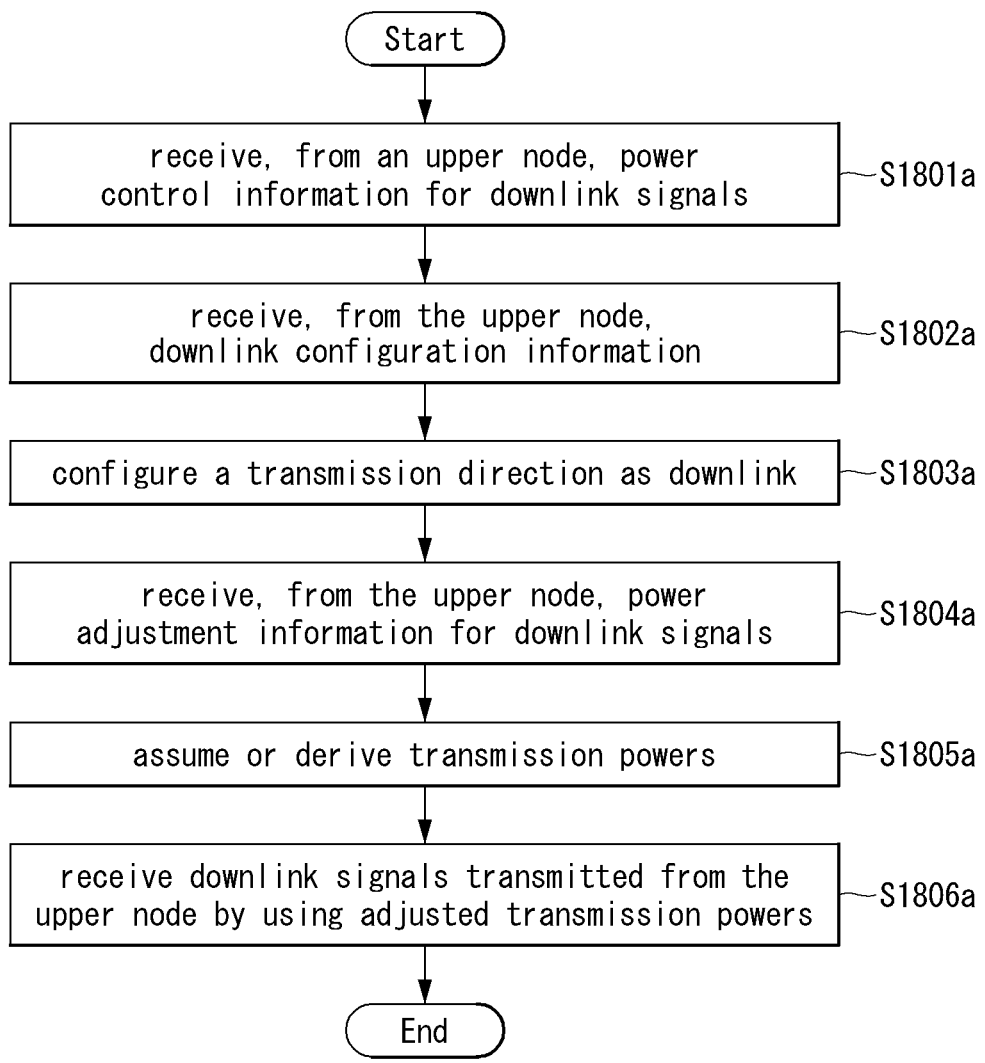
FIG. 18A is a flowchart illustrating a first exemplary embodiment of a transmission and reception method of an IAB node in a communication system.

FIG. 18A is a flowchart illustrating a first exemplary embodiment of a transmission and reception method of an IAB node in a communication system.

Referring to FIG. 18A, in a transmission/reception method of an IAB node, the IAB node may receive, from an upper node, power control information for a transmission power of a downlink channel or signal through L1 signaling or a higher layer parameter (S1801a). Accordingly, the IAB node may assume or derive the transmission power of the downlink signal transmitted from the upper node according to the received power control information. Then, the IAB node may receive, from the upper node, downlink configuration information for a specific time period (S1802a). Accordingly, the IAB node may configure a transmission direction for the specific time period as downlink (S1803a). Here, the IAB node separately receives the power control information and the downlink configuration information from the upper node, but may receive the power control information as being included in the downlink configuration information. Thereafter, the IAB node may receive, from the upper node, power adjustment information for the transmission power of the downlink channel or signal through L1 signaling or a higher layer parameter (S1804a).

Here, the power adjustment information may include at least one of SSB beam information, CSI-RS beam information, PDCCH beam information, PDSCH bean information, or a combination thereof. Such the beam information may be represented by at least one of one or more transmission configuration indicator (TCI) states, SSB resource indexes, and CSI-RS resource indexes. In addition, the information on the specific time period may be information on a time resource represented by one of symbol index sets, slot index sets, subframe index sets, and frame index sets. In addition, the information on the specific time period may be information on a time resource in which the IAB-MT and IAB-DU constituting the IAB node are configured or determined to perform communications at the same time as being multiplexed in one of the frequency division scheme and the spatial division scheme.

Then, the IAB node may assume or derive the adjusted transmission power of the downlink signal transmitted from the upper node based on the power adjustment information received from the upper node (S1805a). Thereafter, the IAB node may receive the downlink signal transmitted from the upper node of the IAB node by using the adjusted transmission power (S1806a).

Figure 18B:
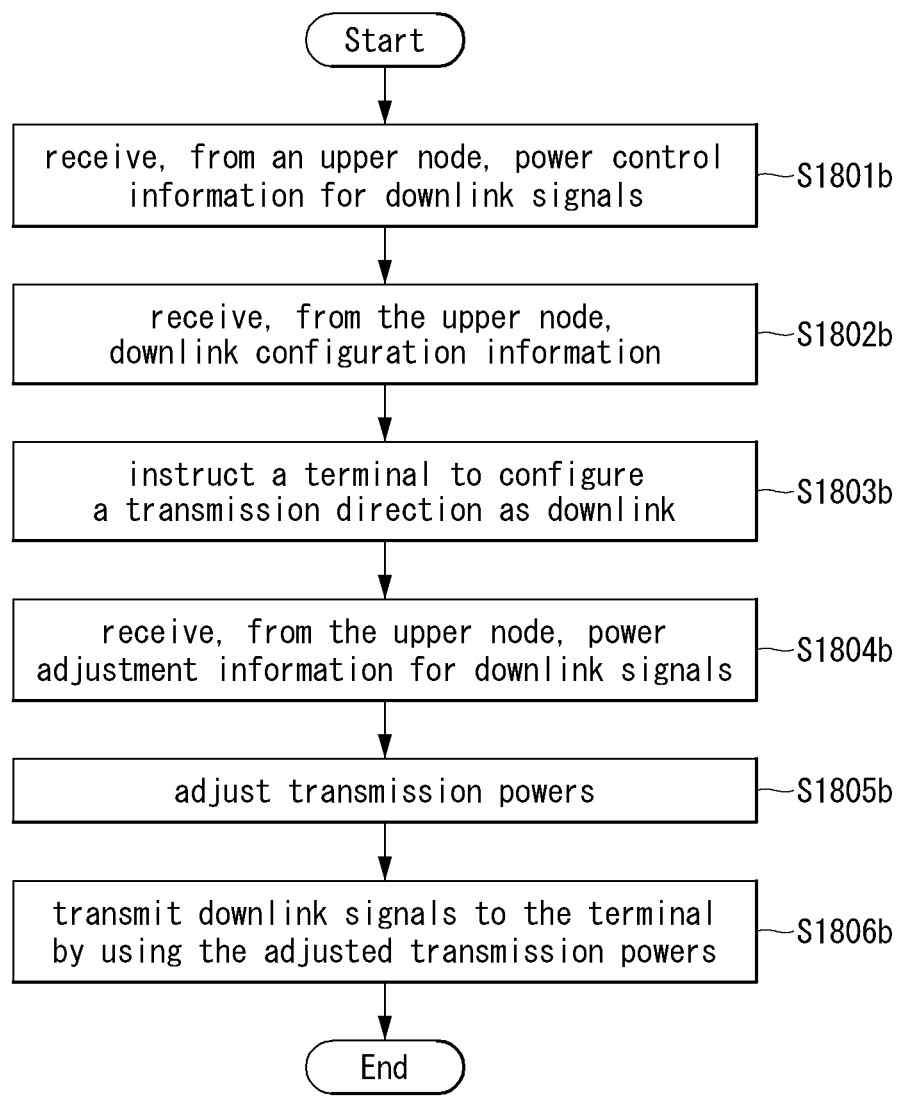
FIG. 18B is a flowchart illustrating a second exemplary embodiment of a transmission and reception method of an IAB node in a communication system.

FIG. 18B is a flowchart illustrating a second exemplary embodiment of a transmission and reception method of an IAB node in a communication system.

Referring to FIG. 18B, in a transmission/reception method of an IAB node, the IAB node may receive, from an upper node, power control information for a transmission power of a downlink channel or signal through L1 signaling or a higher layer parameter (S1801b). Accordingly, the IAB node may configure the transmission power of the downlink signal according to the received power control information. Then, the IAB node may receive downlink configuration information for a specific time period from the upper node (S1802b). Then, the IAB node may instruct the terminal to configure a transmission direction for the specific time period as downlink (S1803b). Thereafter, the IAB node may receive, from the upper node, power adjustment information for the transmission power of the downlink channel or signal through L1 signaling or a higher layer parameter (S1804b).

Then, the IAB node may adjust the transmission power of the downlink signal based on the power adjustment information received from the upper node (S1805b). Thereafter, the IAB-DU of the IAB node may transmit the downlink signal to the terminal by using the adjusted transmission power (S1806b). Of course, the IAB node may receive, from the upper node, the downlink configuration information of the IAB-MT for the specific time period. Accordingly, the IAB-MT of the IAB node may receive, from the upper node, the downlink signal in the specific time period. Alternatively, the IAB node may receive, from the upper node, uplink configuration information of the IAB-MT for the specific time period. Accordingly, the IAB-MT of the IAB node may transmit an uplink signal to the upper node in the specific time period.

Figure 19:
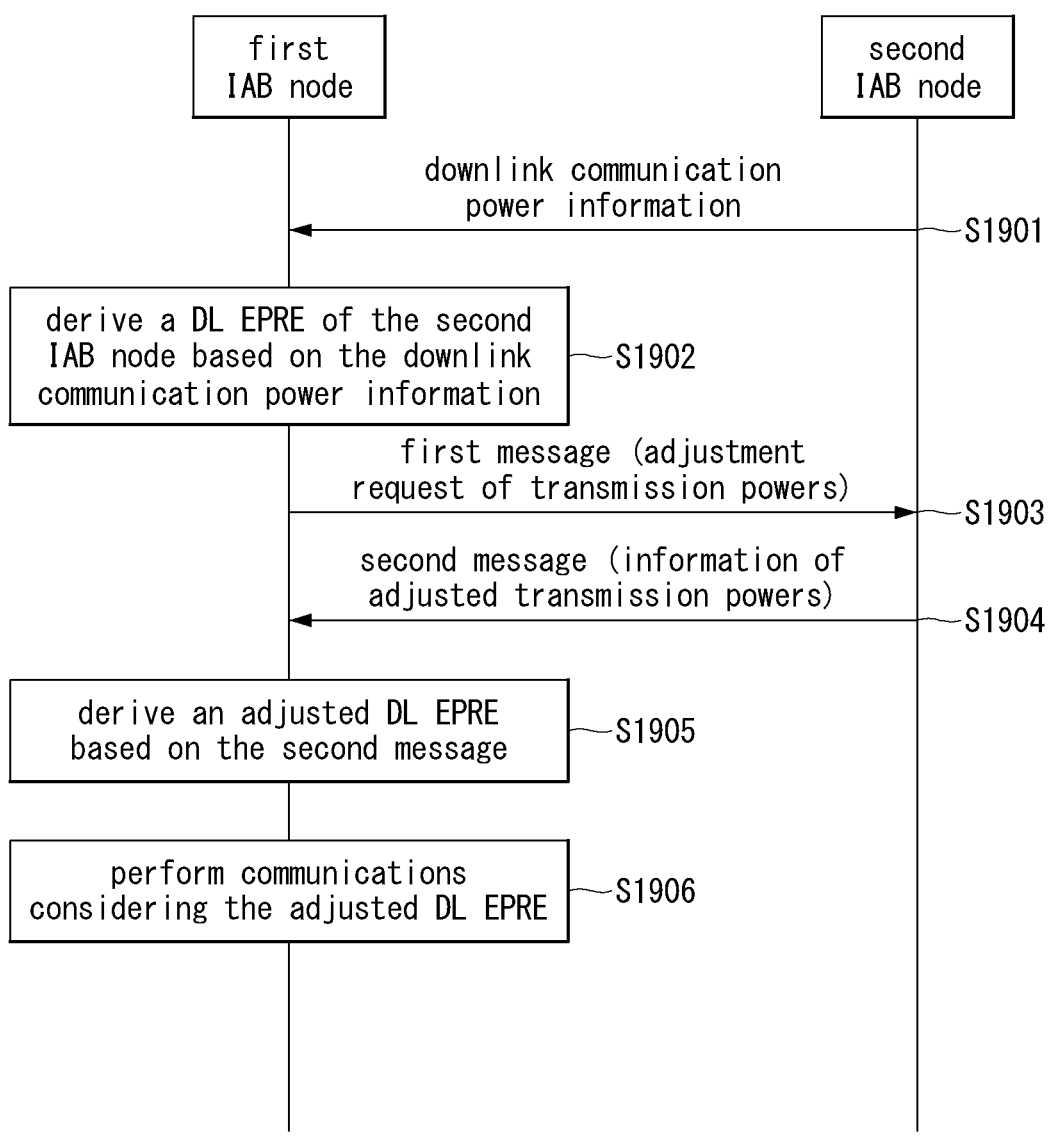
FIG. 19 is a sequence chart illustrating a first exemplary embodiment of a power control method of an IAB node.

FIG. 19 is a sequence chart illustrating a first exemplary embodiment of a power control method of an IAB node.

Referring to FIG. 19, a communication system may include a first IAB node and a second IAB node. The second IAB node may be an upper node (e.g., parent node) of the first IAB node. The first IAB node may communicate with other communication nodes. For example, the first IAB node may perform simultaneous transmission and reception operations with other communication nodes. Other communication nodes may include 'the second IAB node and a third IAB node' or 'the second IAB node and a terminal'. The third IAB node may be a lower node (e.g., child node) of the first IAB node. In another example, the third IAB node may be another upper node (e.g., second parent node) of the first IAB node.

The second IAB node may transmit information on downlink communication power information to the first IAB node (S1901). The downlink communication power information may include an EPRE and/or a power control offset (i.e., powerControlOffsetIAB) of a CSI-RS transmitted by the second IAB node. The downlink communication power information may be transmitted through higher layer message(s) of the second IAB node. The EPRE and the power control offset of the CSI-RS may be included in the same higher layer message or different higher layer messages.

The first IAB node may receive the downlink communication power information of the second IAB node (e.g., EPRE and power control offset of the CSI-RS) from the second IAB node. The first IAB node may derive an EPRE of a PDSCH transmitted by the second IAB node in consideration of the EPRE and power control offset of the CSI-RS (S1902). For example, the first IAB node may derive the EPRE of the PDSCH transmitted by the second IAB node by applying the power control offset to the EPRE of the CSI-RS. The first IAB node may transmit a first message requesting adjustment of a transmission power of the PDSCH transmitted by the second IAB node to the second IAB node (S1903). The step S1903 may be performed when it is required to adjust the transmission power of the PDSCH transmitted by the second IAB node for the purpose of performing simultaneous DU/MT operations of the first IAB node. The first message transmitted in the step S1903 may be a MAC CE. The MAC CE may include an indicator requesting adjustment of the transmission power and/or a transmission power adjustment value desired by the first IAB node (e.g., a relative change (e.g., 3 dB, 1 dB, −1 dB, −3 dB, etc.) compared to the previous transmission power). In addition, the MAC CE may further include a type indicator indicating that the MAC CE is a MAC CE requesting adjustment of the transmission power of the second IAB node. The first message may be transmitted on a PUSCH (e.g., payload of MsgA) and/or a PUCCH. For example, when the first message is transmitted through the payload of MsgA, the procedure for adjusting the transmission power (e.g., EPRE) of the PDSCH of the second IAB node may be performed through a 2-step random access (RA) procedure.

The second IAB node may receive from the first IAB node the first message requesting adjustment of the transmission power. The second IAB node may identify that adjustment of the transmission power of the PDSCH transmitted by the second IAB node has been requested based on the information element(s) included in the first message. The second IAB node may transmit a second message including information on the adjusted transmission power to the first IAB node (S1904). The second message may be transmitted on a PDSCH. The second message may be a MAC CE and may be transmitted in response to the first message. In addition, the second message may further include information indicating that the adjustment of the transmission power requested by the first IAB node has been accepted. In addition, the MAC CE may further include a type indicator indicating that the MAC CE is a MAC CE including information on the adjusted transmission power of the second IAB node. The information on the adjusted transmission power included in the second message may be the adjustment value of the transmission power included in the first message. Alternatively, the second IAB node may adjust the transmission power of the PDSCH in consideration of the adjustment value of the transmission power included in the first message, and transmit the second message including information on the adjusted transmission power to the first IAB node. In this case, the second IAB node may transmit the PDSCH based on the information on the adjusted transmission power included in the second message.

In addition, the second message may include time resource information and/or frequency resource information on time and/or frequency resources to which the information of the adjusted transmission power is applied. The time resource information may be configured in units of symbols, mini-slots, or slots. The frequency resource information may indicate a frequency band in which the first IAB node operates. Alternatively, the time resource information and/or frequency resource information to which the adjusted transmission power information is applied may be preconfigured by higher layer signaling of the second IAB node instead of the second message.

On the other hand, before the step S1904, the second IAB node may transmit control information (e.g., DCI) including information on a transmission resource of the second message to the first IAB node. The control information may be scrambled by a specific RNTI (e.g., power adjustment (PA)-RNTI, MsgB-RNTI, or the like). In this case, the first IAB node may perform a monitoring operation for receiving the control information by using the specific RNTI before reception of the second message. Upon receiving the control information, the first IAB node may receive the second message in the resource indicated by the control information.

The first IAB node may receive the second message from the second IAB node, and may identify information on the adjusted transmission power of the PDSCH included in the second message. The first IAB node may derive an adjusted EPRE of the PDSCH by applying the adjusted transmission power to the EPRE of the PDSCH derived in the step S1902 (S1905). In this case, the first IAB node may determine that the PDSCH transmitted by the second IAB node has the adjusted EPRE.

The second IAB node may inform the first IAB node of information on beam(s) to which the second message (e.g., information on the adjusted transmission power) is applied. The information on the beam(s) may be indicated by the second message, the control information for scheduling the second message, and/or higher layer signaling. The information on the beam(s) may include TCI state(s) and/or RS resource index(es). When the information on the beam(s) is indicated to the first IAB node, the first IAB node may apply the information on the adjusted transmission power to the beam(s) indicated by the second IAB node. When the information on the beam(s) to which the second message (e.g., information of the adjusted transmission power) is applied is not received from the second IAB node, the first IAB node may determine that the information of the adjusted transmission power is applied to all beams. Alternatively, when the information on the beam(s) to which the second message (e.g., information of the adjusted transmission power) is applied is not received from the second IAB node, the first IAB node may determine that the information on the adjusted transmission power is not applied.

The first IAB node may perform communications in consideration of the adjusted EPRE of the PDSCH derived in the step S1905 (S1906). In the step S1906, the first IAB node may perform simultaneous transmission/reception operations with other communication nodes (e.g., the second IAB node and the third IAB node). In this case, the first IAB node may perform an operation of determining a transmission power of a channel and/or signal transmitted to the third IAB node or terminal and/or an operation of controlling or removing interference caused by the simultaneous transmission and reception operations in consideration of the adjusted EPRE of the PDSCH transmitted by the second IAB node.

Figure 20:
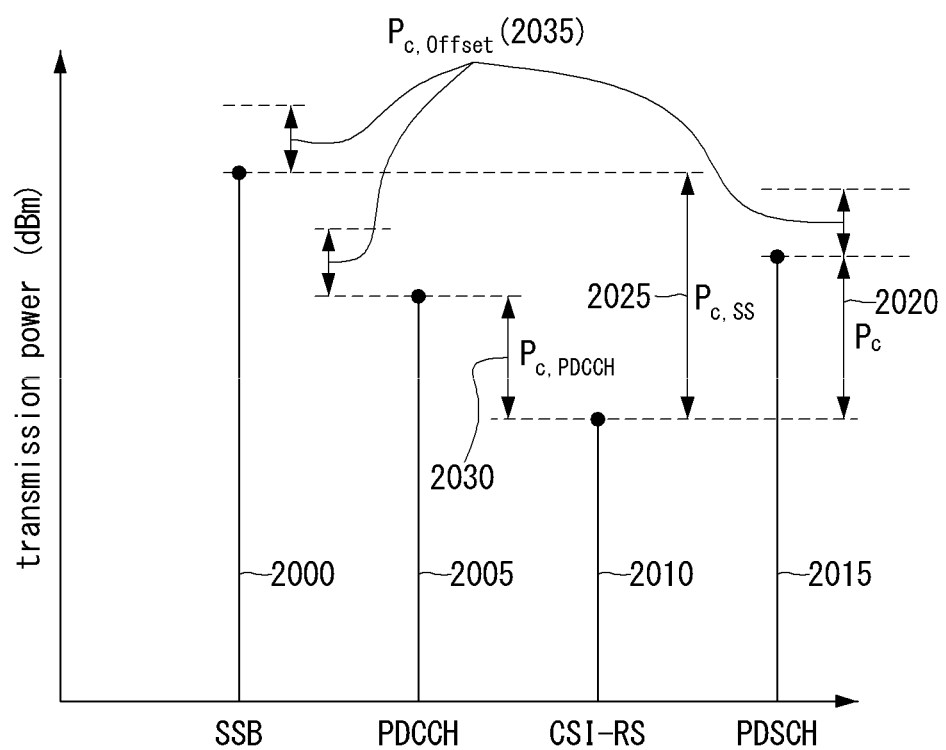
FIG. 20 is a graph illustrating a first exemplary embodiment of power control information and power adjustment information.

FIG. 20 is a graph illustrating a first exemplary embodiment of power control information and power adjustment information.

Referring to FIG. 20, the power control information received by the IAB node from the upper node may include an SSB transmission power 2000, a PDSCH relative transmission power $P_c$ 2020 which is a difference of a PDSCH EPRE with respect to a CSI-RS EPRE, an SSB relative transmission power $P_{c,SS}$ 2025 which is a difference of an SSB EPRE with respect to the CSI-RS EPRE, and/or a PDCCH relative transmission power $P_{c,PDCCH}$ 2030 which is a difference of a PDCCH EPRE with respect to the CSI-RS EPRE. In this case, the IAB node may receive information of the SSB transmission power 2000 from the upper node through a higher layer parameter for SSB transmission included in a serving cell common configuration signal. In addition, through higher layer parameter(s) for power control offset, the IAB node may receive information on the PDSCH relative transmission power $P_c$ 2020, information on the SSB relative transmission power $P_{c,SS}$ 2025, and information on the PDCCH relative transmission power $P_{c,PDCCH}$ 2030. Accordingly, the IAB node may calculate a transmission power 2005 of a PDCCH, a transmission power 2010 of a CSI-RS, and a transmission power 2015 of a PDSCH by using the SSB transmission power 2000, the PDSCH relative transmission power $P_c$ 2020 which is a difference of the PDSCH EPRE with respect to the CSI-RS EPRE, the SSB relative transmission power $P_{c,SS}$ 2025 which is a difference of the SSB EPRE with respect to the CSI-RS EPRE, and/or the PDCCH relative transmission power $P_{c,PDCCH}$ 2030 which is a difference of the PDCCH EPRE with respect to the CSI-RS EPRE. Of course, the PDCCH relative transmit power $P_{c,PDCCH}$, which is a difference between the PDCCH EPRE and the CSI-RS EPRE, may follow a predetermined value (e.g., 0 dB).

Meanwhile, referring to FIG. 20, the power adjustment information may include information on a power offset $P_{c,offset}$ 2035. Here, the information on the power offset 2035 may be common to the SSB transmission power 2000, the PDCCH transmission power 2005, and the PDSCH transmission power 20115.

In this manner, the IAB node may receive, from the upper node, the power adjustment information to be used for transmitting the downlink signals. In addition, the IAB node may adjust the transmission powers of the downlink signals according to the received power adjustment information. In this case, the IAB node may adjust the transmission powers to reduce the transmission power of each downlink channel/signal according to the power offset 2035 during simultaneous DU/MT transmission/reception. Alternatively, the IAB node may adjust the transmission powers to increase the transmission power of each downlink channel/signal according to the power offset 2035 during simultaneous DU/MT transmission/reception. In this case, the IAB node may receive information on the power offset 2035 through L1 signaling. Alternatively, the IAB node may receive the information on the power offset 2035 through a higher layer parameter. Alternatively, the IAB node may receive the information on the power offset 2035 through a combination of L1 signaling and higher layer parameter.

As described above, the signaling structure for the method in which the IAB node adjusts the transmission powers by receiving from the upper node the information on the power offset 2035 common to the SSB transmission power 2000, the PDCCH transmission power 2005, and the PDSCH transmission power 2015 may be simple. In addition, the signaling burden may be small, and there may be an advantage that a ratio of the transmission powers of channels and signals does not change with time. In this case, the IAB node may maintain $P_{c,PDCCH}$ to be 0 dB when actually applying the power offset to the SSB transmission power 2000, the PDCCH transmission power 2005, and the PDSCH transmission power 2015. As a result, the IAB node and the upper node may minimize the influence on operation methods based on a power ratio between CSI-RS and PDCCH, such as beam failure detection (BFD).

Figure 21:
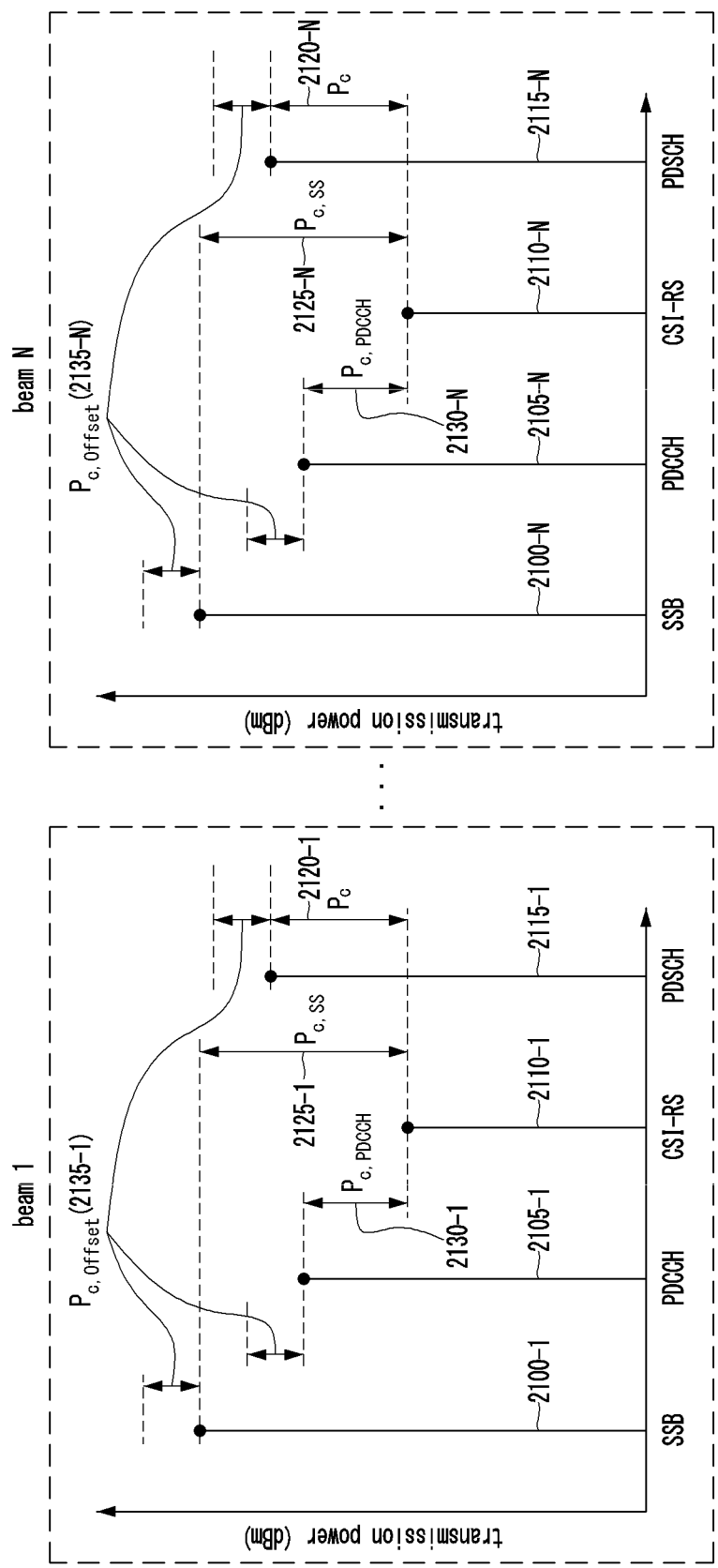
FIG. 21 is a graph illustrating a second exemplary embodiment of power control information and power adjustment information.

FIG. 21 is a graph illustrating a second exemplary embodiment of power control information and power adjustment information.

Referring to FIG. 21, for a case where the IAB node uses N beams (e.g., beam 1 to beam N), the power control information received by the IAB node from the upper node may include information on SSB transmission powers 2100-1 to 2100-N for the respective beams, information on PDSCH relative transmission powers $P_c$ 2120-1 to 2120-N each of which is a difference of a PDSCH EPRE with respect to a CSI-RS EPRE, information on SSB relative transmission powers $P_{c,SS}$ 2125-1 to 2125-N each of which a difference of an SSB EPRE with respect to the CSI-RS EPRE, and information on PDCCH relative transmission powers $P_{c,PDCCH}$ 2130-1 to 2130-N each of which is a difference of a PDCCH EPRE with respect to the CSI-RS EPRE.

In this case, the IAB node may receive information on the SSB transmission powers 2100-1 to 2100-N for the respective beams from the upper node through a higher layer parameter for SSB transmission included in a serving cell common configuration signal. In addition, the IAB node may receive, through higher layer parameter(s) for power control offset, the information on the PDSCH relative transmission powers $P_c$ 2120-1 to 2120-N each of which is a difference of a PDSCH EPRE with respect to a CSI-RS EPRE, the information on the SSB relative transmission powers $P_{c,SS}$ 2125-1 to 2125-N each of which a difference of an SSB EPRE with respect to the CSI-RS EPRE, and the information on the PDCCH relative transmission powers $P_{c,PDCCH}$ 2130-1 to 2130-N each of which is a difference of a PDCCH EPRE with respect to the CSI-RS EPRE. Accordingly, the IAB node may calculate transmission powers 2105-1 to 2105-N of PDCCHs, transmission powers 2110-1 to 2110-N of CSI-RSs, and transmission powers 2115-1 to 2115-N of PDSCHs for the respective beams by using the information on the SSB transmission powers 2100-1 to 2100-N for the respective beams, the information on the PDSCH relative transmission powers $P_c$ 2120-1 to 2120-N each of which is a difference of a PDSCH EPRE with respect to a CSI-RS EPRE, the information on the SSB relative transmission powers $P_{c,SS}$ 2125-1 to 2125-N each of which a difference of an SSB EPRE with respect to the CSI-RS EPRE, and the information on the PDCCH relative transmission powers $P_{c,PDCCH}$ 2130-1 to 2130-N each of which is a difference of a PDCCH EPRE with respect to the CSI-RS EPRE. Of course, the PDCCH relative transmission powers $P_{c,PDCCH}$, each of which is a difference of a PDCCH EPRE with respect to the CSI-RS EPRE, may follow a predetermined value (e.g., 0 dB). A communication system using multiple beams in a high frequency band of a frequency range (FR) 2 may be able to independently apply downlink transmission powers to each beam.

Here, the information on power offsets 2135-1 to 2135-N for the respective beams may be common to the SSB transmission powers 2100-1 to 2100-N, the PDCCH transmission powers 2105-1 to 2105-N, and the PDSCH transmission powers 2115-1 to 2115-N.

As described above, the IAB node may receive the power control information to be used for transmitting the downlink signals from the upper node, and may configure the transmission powers of the downlink signals for each beam according to the received power control information. In this case, the IAB node may receive from the upper node information on the power offsets 2135-1 to 2135-N for the respective beams to be applied during simultaneous DU/MT transmission/reception, and may adjust the transmission powers to be used for transmitting the downlink signals according to the received information on the power offsets 2135-1 to 2135-N for the respective beams. In this case, the IAB-DU may adjust the transmission powers to reduce the transmission power of each downlink channel/signal for each beam according to the information on the power offsets 2135-1 to 2135-N during simultaneous DU/MT transmission/reception. Alternatively, the IAB node may adjust the transmission powers to increase the transmission power of each downlink channel/signal for each beam according to the information on the power offsets 2135-1 to 2135-N during simultaneous DU/MT transmission/reception. In this case, the IAB node may receive the information on the power offsets 2135-1 to 2135-N for the respective beams through L1 signaling. Alternatively, the IAB node may receive the information on the power offsets 2135-1 to 2135-N for the respective beams through a higher layer parameter. Alternatively, the IAB node may receive the information on the power offsets 2135-1 to 2135-N for the respective beams through a combination of L1 signaling and higher layer parameter.

As described above, the signaling structure for the method in which the IAB node adjusts the transmission powers by receiving from the upper node the information on the power offsets common to the SSB transmission powers, the PDCCH transmission powers, and the PDSCH transmission powers may be simple. In addition, the signaling burden may be small, and there may be an advantage that a ratio of transmission powers of channels and signals does not change with time. In this case, the IAB node may maintain $P_{c,PDCCH}$ to be 0 dB when actually applying the power offsets to the SSB transmission powers, the PDCCH transmission powers, and the PDSCH transmission powers. As a result, the IAB node and the upper node may minimize the influence on operation methods based on a power ratio between CSI-RS and PDCCH, such as BFD. Meanwhile, such the method may have an advantage in that a ratio of the transmission powers of the channels/signals can be differently operated in consideration of the characteristics of the respective beams.

Figure 22:
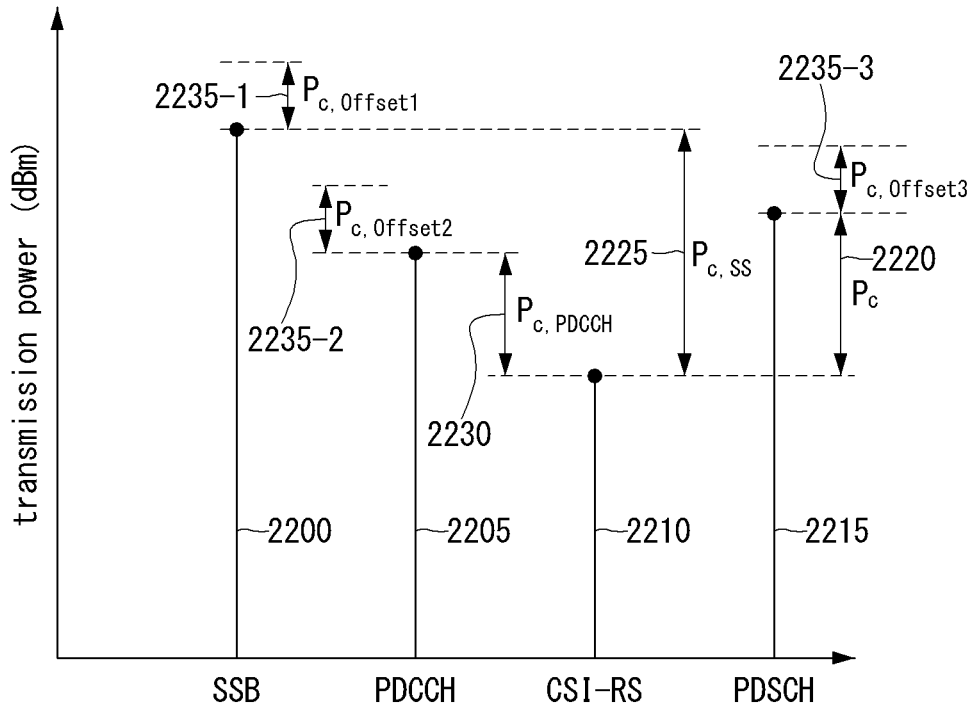
FIG. 22 is a graph illustrating a third exemplary embodiment of power control information and power adjustment information.

FIG. 22 is a graph illustrating a third exemplary embodiment of power control information and power adjustment information.

Referring to FIG. 22, the power control configuration information received by the IAB node from the upper node may include information on an SSB transmission power 2200, information on a PDSCH relative transmission power $P_c$ 2220 which is a difference of a PDSCH EPRE with respect to a CSI-RS EPRE, information on an SSB relative transmission power $P_{c,SS}$ 2225 which is a difference of an SSB EPRE with respect to the CSI-RS EPRE, and information on a PDCCH relative transmission power $P_{c,PDCCH}$ 2230 which is a difference of a PDCCH EPRE with respect to the CSI-RS EPRE. The IAB node may receive, through higher layer parameters for power control offset, the information on the PDSCH relative transmission powers $P_c$ 2220 which is a difference of a PDSCH EPRE with respect to a CSI-RS EPRE, the information on the SSB relative transmission power $P_{c,SS}$ 2225 which is a difference of an SSB EPRE with respect to the CSI-RS EPRE, and the information on the PDCCH relative transmission power $P_{c,PDCCH}$ 2230 which is a difference of a PDCCH EPRE with respect to the CSI-RS EPRE. Accordingly, the IAB node may calculate a PDCCH transmission power 2205, a CSI-RS transmission power 2210, and a PDSCH transmission power 2215 by using the information on the SSB transmission power 2200, the information on the PDSCH relative transmission powers $P_c$ 2220 which is a difference of a PDSCH EPRE with respect to a CSI-RS EPRE, the information on the SSB relative transmission power $P_{c,SS}$ 2225 which is a difference of an SSB EPRE with respect to the CSI-RS EPRE, and the information on the PDCCH relative transmission power $P_{c,PDCCH}$ 2230 which is a difference of a PDCCH EPRE with respect to the CSI-RS EPRE. Of course, the PDCCH relative transmission power $P_{c,PDCCH}$, which is a difference of the PDCCH EPRE with respect to the CSI-RS EPRE, may follow a predetermined value (e.g., 0 dB).

Meanwhile, referring to FIG. 22, the power adjustment information may include at least one of information on a power offset 2235-1 for the SSB transmission power, information on a power offset 2235-2 for the PDCCH transmission power, and information on a power offset 2235-3 for the PDSCH transmission power. As such, the power offsets 2235-1, 2235-2, and 2235-3 may be applied to the SSB transmission power, the PDCCH transmission power 2205, and the PDSCH transmission power 2215, respectively.

As described above, the IAB node may receive from the upper node the power adjustment information to be used for transmitting the downlink signals, and may adjust the transmission powers of the downlink signals according to the received power adjustment information. In this case, the IAB node may receive from the upper node information on the power offsets 2235-1, 2235-2, and 2235-3 to be applied during simultaneous DU/MT transmission/reception, and adjust the transmission powers to be used for transmitting the downlink signals according to the received information on the power offsets 2235-1, 2235-2, and 2235-3.

In this case, the IAB-DU may adjust the transmission powers to reduce the transmission power of each downlink channel/signal for each beam according to the information on the power offsets 2235-1, 2235-2, and 2135-3 during simultaneous DU/MT transmission/reception. Alternatively, the IAB node may adjust the transmission powers to increase the transmission power of each downlink channel/signal for each beam according to the information on the power offsets 2235-1, 2235-2, and 2135-3 during simultaneous DU/MT transmission/reception. In this case, the IAB node may receive the information on the power offsets 2235-1, 2235-2, and 2135-3 through L1 signaling. Alternatively, the IAB node may receive the information on the power offsets 2235-1, 2235-2, and 2135-3 through a higher layer parameter. Alternatively, the IAB node may receive the information on the power offsets 2235-1, 2235-2, and 2135-3 through a combination of L1 signaling and higher layer parameter.

As described above, the method in which the IAB node adjusts the transmission powers by receiving from the upper node the information on the power offsets 2235-1, 2235-2, and 2135-3 respectively applied to the SSB transmission power 2200, the PDCCH transmission power 2205, and the PDSCH transmission power 2215 may have an advantage of maximizing the degree of freedom in adjusting the ratio of transmission powers of channels and signals.

Figure 23:
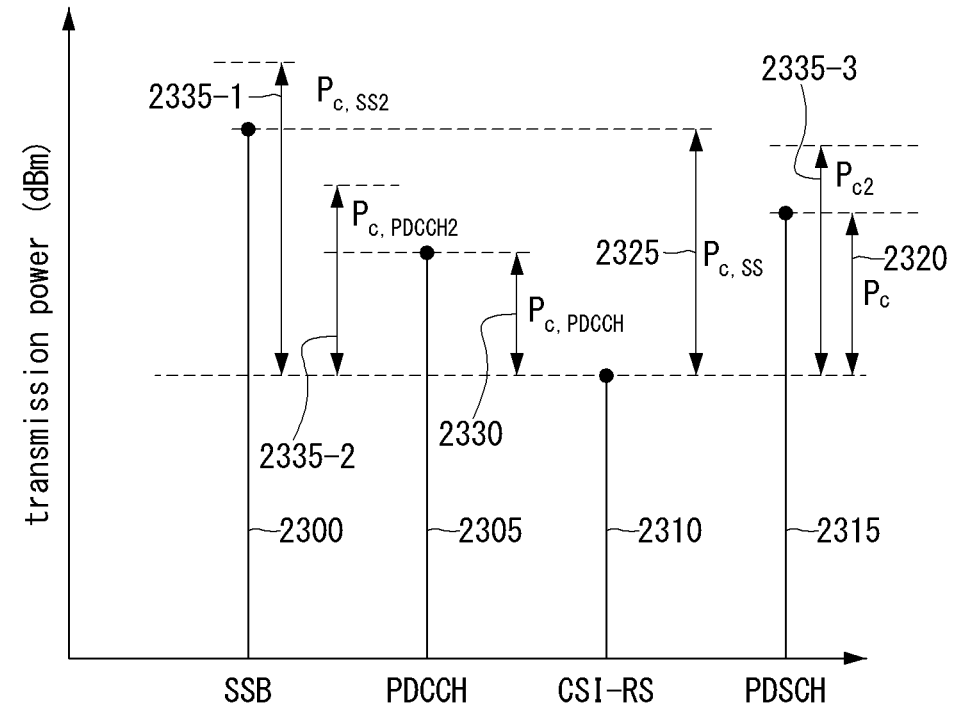
FIG. 23 is a graph illustrating a fourth exemplary embodiment of power control information and power adjustment information.

FIG. 23 is a graph illustrating a fourth exemplary embodiment of power control information and power adjustment information.

Referring to FIG. 23, the power control information received by the IAB node from the upper node may include information on an SSB transmission power 2300, information on a first PDSCH relative transmission power $P_c$ 2320 which is a difference of a PDSCH EPRE with respect to a CSI-RS EPRE, information on a first SSB relative transmission power $P_{c,SS}$ 2325 which a difference of an SSB EPRE with respect to the CSI-RS EPRE, and information on a first PDCCH relative transmission power $P_{c,PDCCH}$ 2330 which is a difference of a PDCCH EPRE with respect to the CSI-RS EPRE. In this case, the IAB node may receive the information on the SSB transmission power 2300 from the upper node through a higher layer parameter for SSB transmission included in a serving cell common configuration signal. In addition, the IAB node may receive, through higher layer parameters for power control offset, the information on the first PDSCH relative transmission power $P_c$ 2320 which is a difference of a PDSCH EPRE with respect to a CSI-RS EPRE, the information on the first SSB relative transmission power $P_{c,SS}$ 2325 which a difference of an SSB EPRE with respect to the CSI-RS EPRE, and the information on the first PDCCH relative transmission power $P_{c,PDCCH}$ 2330 which is a difference of a PDCCH EPRE with respect to the CSI-RS EPRE. Accordingly, the IAB node may calculate a PDCCH transmission power 2305, a CSI-RS transmission power 2310, and a PDSCH transmission power 2315 by using the information on the SSB transmission power 2300, the information on the first PDSCH relative transmission power $P_c$ 2320 which is a difference of a PDSCH EPRE with respect to a CSI-RS EPRE, the information on the first SSB relative transmission power $P_{c,SS}$ 2325 which a difference of an SSB EPRE with respect to the CSI-RS EPRE, and the information on the first PDCCH relative transmission power $P_{c,PDCCH}$ 2330 which is a difference of a PDCCH EPRE with respect to the CSI-RS EPRE. Of course, the first PDCCH relative transmission power $P_{c,PDCCH}$, which is a difference of the PDCCH EPRE with respect to the CSI-RS EPRE, may follow a predetermined value (e.g., 0 dB).

Meanwhile, referring to FIG. 23, the power adjustment information may include at least one of information on a second SSB relative transmission power $P_{c,SS2}$ 2335-1 which is a difference of an SSB EPRE with respect to the CSI-RS EPRE, information on a second PDCCH relative transmission power $P_{c,PDCCH2}$ 2325-2 which a difference of a PDCCH EPRE with respect to the CSI-RS EPRE, and information on a second PDSCH relative transmission power $P_{c,PDSCH2}$ 2335-3 which is a difference of a PDSCH EPRE with respect to the CSI-RS EPRE. As such, the relative transmission powers 2335-1, 2335-2, and 2335-3 may be applied to the SSB transmission power 2300, the PDCCH transmission power 2305, and the PDSCH transmission power 2315, respectively.

As described above, the IAB node may receive from the upper node the power adjustment information to be used for transmitting the downlink signals, and may adjust the transmission powers of the downlink signals according to the received power adjustment information. In this case, the IAB node may receive from the upper node information on the relative transmission powers 2335-1, 2335-2, and 2335-3 to be applied during simultaneous DU/MT transmission/reception, and adjust the transmission powers to be used for transmitting the downlink signals according to the received information on the relative transmission powers 2335-1, 2335-2, and 2335-3.

In this case, the IAB-DU may adjust the transmission powers to reduce the transmission power of each downlink channel/signal according to the information on the relative transmission powers 2335-1, 2335-2, and 2335-3 during simultaneous DU/MT transmission/reception. Alternatively, the IAB node may adjust the transmission powers to increase the transmission power of each downlink channel/signal according to the information on the relative transmission powers 2335-1, 2335-2, and 2335-3 during simultaneous DU/MT transmission/reception. In this case, the IAB node may receive the information on the relative transmission powers 2335-1, 2335-2, and 2335-3 through L1 signaling. Alternatively, the IAB node may receive the information on the relative transmission powers 2335-1, 2335-2, and 2335-3 through a higher layer parameter. Alternatively, the IAB node may receive the information on the relative transmission powers 2335-1, 2335-2, and 2335-3 through a combination of L1 signaling and higher layer parameter.

As described above, the method in which the IAB node adjusts the transmission powers by receiving from the upper node the information on the relative transmission powers 2335-1, 2335-2, and 2335-3 respectively applied to the SSB transmission power 2300, the PDCCH transmission power 2305, and the PDSCH transmission power 2315 may have an advantage of maximizing the degree of freedom in adjusting the ratio of transmission powers of channels and signals. In this case, the IAB node may maintain $P_{c,PDCCH}$ to be 0 dB. As a result, the IAB node and the upper node may minimize the influence on operation methods based on a power ratio between CSI-RS and PDCCH, such as BFD.

In actual implementation of the IAB node, the above-described exemplary embodiments may not be mutually exclusive, and a combination of various exemplary embodiments may be considered. For example, the IAB node may be implemented by using the DU/MT transmission method and the downlink transmission power adjustment method simultaneously. In addition, the IAB node may report to the base station information on which functions among the functions of the exemplary embodiment are implemented or not implemented. Based on this, the base station may indicate what operation the IAB node will perform through L1 signaling or higher layer signaling.

Figure 24:
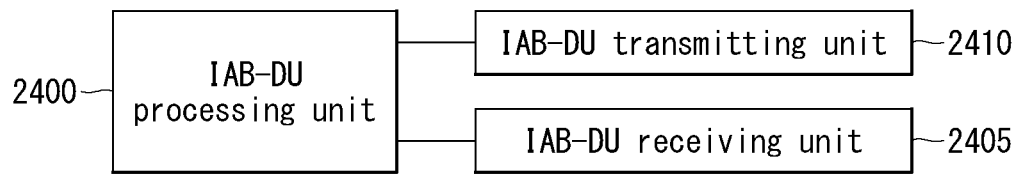
FIG. 24 is a block diagram illustrating a first exemplary embodiment of an IAB-DU.

FIG. 24 is a block diagram illustrating a first exemplary embodiment of an IAB-DU.

Referring to FIG. 24, the IAB-DU may include an IAB-DU processing unit 2400, an IAB-DU receiving unit 2405, and an IAB-DU transmitting unit 2410. The configuration of FIG. 24 is an example, and each component of the actual IAB-DU may be divided in more detail according to exemplary embodiments of the present disclosure or the intention of the operator, or they may be configured in an integrated form. The IAB-DU processing unit 2400 may determine and process the overall operations of the IAB-DU, and may store various information and procedures for the operations. In addition, the IAB-DU processing unit may control the IAB-DU receiving unit 2405 to the IAB-DU transmitting unit 2410 to appropriately perform transmission and reception of radio signals. In particular, the IAB-DU processing unit 2400 may perform downlink power control for the IAB-DU according to one of the methods of FIGS. 20 to 23.

Figure 25:
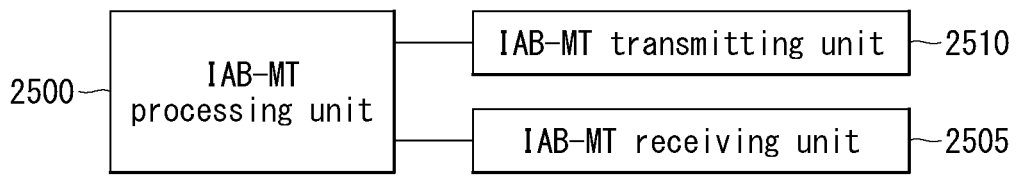
FIG. 25 is a block diagram illustrating a first exemplary embodiment of an IAB-MT.

FIG. 25 is a block diagram illustrating a first exemplary embodiment of an IAB-MT.

Referring to FIG. 25, the IAB-MT may include an IAB-MT processing unit 2500, an IAB-MT receiving unit 2505, and an IAB-MT transmitting unit 2510. The configuration of FIG. 25 is an example, and each component of the actual IAB-MT may be divided in more detail according to exemplary embodiments of the present disclosure or the intention of the operator, or they may be configured in an integrated form. The IAB-MT processing unit 2500 may determine and process the overall operations of the IAB-MT according to exemplary embodiment of the present disclosure, and may store various information and procedures for this purpose. In addition, the IAB-MT processing unit 2500 may control the IAB-MT receiving unit 2505 or the IAB-MT transmitting unit 2510 to appropriately perform transmission and reception of radio signals. In particular, the IAB-MT processing unit 2500 may receive, from an upper node, a signaling on whether to apply downlink power control for the IAB-DU according to one of the methods of FIGS. 20 to 23, and deliver it to the IAB-DU.

Figure 26:
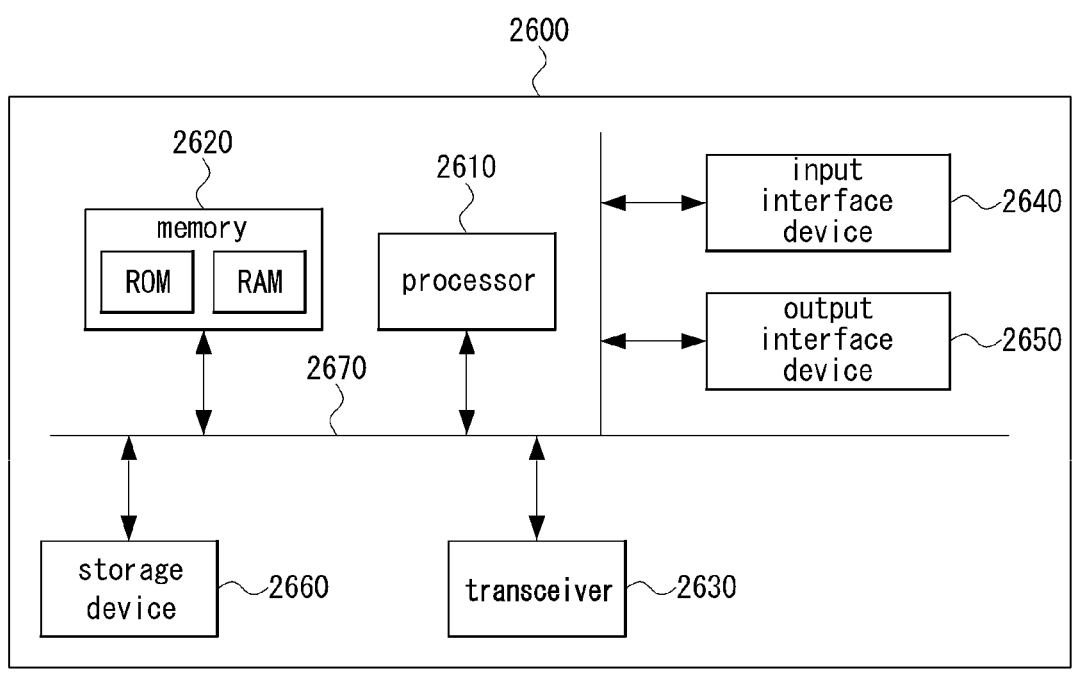
FIG. 26 is a block diagram illustrating a first exemplary embodiment of a communication node constituting a communication system.

FIG. 26 is a block diagram illustrating a first exemplary embodiment of a communication node constituting a communication system.

Referring to FIG. 26, a communication node 2600, as an IAB node, may comprise at least one processor 2610, a memory 2620, and a transceiver 2630 connected to the network for performing communications. Also, the communication node 2600 may further comprise an input interface device 2640, an output interface device 2650, a storage device 2660, and the like. Each component included in the communication node 2600 may communicate with each other as connected through a bus 2670. However, the respective components included in the communication node 2600 may be connected to the processor 2610 via an individual interface or a separate bus, rather than the common bus 2670. For example, the processor 2610 may be connected to at least one of the memory 2620, the transceiver 2630, the input interface device 2640, the output interface device 2650, and the storage device 2660 via a dedicated interface.

The processor 2610 may execute a program stored in at least one of the memory 2620 and the storage device 2660. The processor 2610 may refer to a central processing unit (CPU), a graphics processing unit (GPU), or a dedicated processor on which methods in accordance with embodiments of the present disclosure are performed. Each of the memory 2620 and the storage device 2660 may be constituted by at least one of a volatile storage medium and a non-volatile storage medium. For example, the memory 2620 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a first integrated access and backhaul (IAB) node in a communication system, the operation method comprising:
   receiving, from a second IAB node, information of a power offset;
   deriving a first energy per resource element (EPRE) of a physical downlink shared channel (PDSCH) transmitted by the second IAB node based on the power offset;
   transmitting, to the second IAB node, a first message requesting adjustment of a transmission power of the PDSCH;
   receiving, from the second IAB node, a second message including information on an adjusted transmission power of the PDSCH; and
   deriving an adjusted EPRE of the PDSCH by applying the adjusted transmission power to the first EPRE.

2. The operation method according to claim 1, further comprising performing communications with one or more other IAB nodes in consideration of the adjusted EPRE of the PDSCH transmitted by the second IAB node.

3. The operation method according to claim 2, wherein the communications with the one or more other IAB nodes are simultaneous transmission and reception operations.

4. The operation method according to claim 1, further comprising receiving, from the second IAB node, information on one or more beams to which the adjusted transmission power is applied.

5. The operation method according to claim 4, wherein the information on the one or more beams is information on TCI state(s) or reference signal (RS) resource index(es).

6. The operation method according to claim 1, wherein when information on a beam to which the adjusted transmission power is applied is not received, the adjusted transmission power is estimated to be applied to all beams of the first IAB node.

7. The operation method according to claim 1, wherein the first PRE is derived by applying the power offset to a second EPRE of a channel state information-reference signal (CSI-RS) transmitted by the second IAB node, and information of the second EPRE is received from the second IAB node.

8. The operation method according to claim 1, wherein each of the first message and the second message is a medium access control (MAC) control element (CE).

9. The operation method according to claim 1, wherein the first message includes an adjustment value of the transmission power required by the first IAB node.

10. The operation method according to claim 1, wherein the second message further includes information on time resources to which the adjusted transmission power is applied, and the time resources are configured in units of slots.

11. An operation method of a second integrated access and backhaul (IAB) node in a communication system, the operation method comprising:
   transmitting, to a first IAB node, information of a power offset used to derive a first energy per resource element (EPRE) of a physical downlink shared channel (PDSCH) transmitted by the second IAB node;
   receiving, from the first IAB node, a first medium access control (MAC) control element (CE) requesting adjustment of a transmission power of the PDSCH;
   determining an adjusted transmission power of the PDSCH based on the first MAC CE; and
   transmitting, to the first IAB node, a second MAC CE including information on the adjusted transmission power of the PDSCH,
   wherein an adjusted EPRE of the PDSCH is derived by applying the adjusted transmission power to the first EPRE.

12. The operation method according to claim 11, further comprising transmitting, to the first IAB node, information on one or more beams to which the adjusted transmission power is applied.

13. The operation method according to claim 12, wherein the information on the one or more beams is information on TCI state(s) or reference signal (RS) resource index(es).

14. The operation method according to claim 11, further comprising transmitting, to the first IAB node, information of a second EPRE of a channel state information-reference signal (CSI-RS) transmitted by the second IAB node, wherein the first EPRE is derived by applying the power offset to the second EPRE.

15. The operation method according to claim 11, wherein the second MAC CE further includes information on time resources to which the adjusted transmission power is applied, and the time resources are configured in units of slots.

16. A first integrated access and backhaul (IAB) node in a communication system, the first IAB node comprising:
   a processor;
   a memory electronically communicating with the processor; and
   instructions stored in the memory,
   wherein when executed by the processor, the instructions cause the first IAB node to:
   receive, from a second IAB node, information of a power offset;
   derive a first energy per resource element (EPRE) of a physical downlink shared channel (PDSCH) transmitted by the second IAB node based on the power offset;
   transmit, to the second IAB node, a first message requesting adjustment of a transmission power of the PDSCH;
   receive, from the second IAB node, a second message including information on an adjusted transmission power of the PDSCH; and
   derive an adjusted EPRE of the PDSCH by applying the adjusted transmission power to the first EPRE.

17. The first IAB node according to claim 16, wherein the instructions further cause the first IAB node to perform communications with one or more other IAB nodes in consideration of the adjusted EPRE of the PDSCH transmitted by the second IAB node.

18. The first IAB node according to claim 16, wherein the instructions further cause the first IAB node to receive, from the second IAB node, information on one or more beams to which the adjusted transmission power is applied.

19. The first IAB node according to claim 18, wherein the information on the one or more beams is information on TCI state(s) or reference signal (RS) resource index(es).

20. The first IAB node according to claim 16, wherein when information on a beam to which the adjusted transmission power is adjusted is not received, the adjusted transmission power is estimated to be applied to all beams of the first IAB node.

* * * * *